(12) United States Patent
Guo et al.

(10) Patent No.: US 12,387,013 B1
(45) Date of Patent: Aug. 12, 2025

(54) DATA INTEGRATION AND QUALITY CONTROL SYSTEM

(71) Applicant: Athos Therapeutics Inc., Torrance, CA (US)

(72) Inventors: Jun Guo, Torrance, CA (US); Dimitra Chalkia, Fullerton, CA (US); Colin John Robertson, Culver City, CA (US)

(73) Assignee: Athos Therapeutics Inc., Torrance, CA (US)

( * ) Notice: Subject to any disclaimer, the term of this patent is extended or adjusted under 35 U.S.C. 154(b) by 0 days.

(21) Appl. No.: 19/005,913

(22) Filed: Dec. 30, 2024

(51) Int. Cl.
*G06F 21/64* (2013.01)
*G06F 16/16* (2019.01)
*G06F 16/182* (2019.01)
*G06F 16/21* (2019.01)
*G06F 16/34* (2019.01)

(52) U.S. Cl.
CPC ............ *G06F 21/64* (2013.01); *G06F 16/164* (2019.01); *G06F 16/183* (2019.01); *G06F 16/21* (2019.01); *G06F 16/345* (2019.01); *G06F 2221/03* (2013.01)

(58) Field of Classification Search
None
See application file for complete search history.

(56) References Cited

U.S. PATENT DOCUMENTS

| | | | |
|---|---|---|---|
| 10,339,147 B1* | 7/2019 | Barmes | G06N 5/046 |
| 12,164,936 B1* | 12/2024 | Chandrasekaran | G06F 16/211 |
| 2014/0280190 A1* | 9/2014 | Cronin | G06F 16/2465 |
| | | | 707/741 |
| 2016/0124946 A1* | 5/2016 | Aaron | H04L 67/10 |
| | | | 707/748 |
| 2017/0286502 A1* | 10/2017 | Bar-Or | G06F 8/34 |
| 2017/0351511 A1* | 12/2017 | Bar-Or | G06F 8/34 |
| 2020/0311136 A1* | 10/2020 | Jun | G06N 3/045 |
| 2021/0158171 A1* | 5/2021 | Rausch | H04L 67/1097 |
| 2021/0342847 A1* | 11/2021 | Shachar | G06Q 20/4016 |
| 2021/0350076 A1* | 11/2021 | Kantor | G06F 40/30 |
| 2022/0245197 A1* | 8/2022 | Gout | G06F 16/215 |
| 2022/0382852 A1* | 12/2022 | Yang | G06F 16/951 |
| 2022/0405235 A1* | 12/2022 | Sahgal | G06F 16/2365 |
| 2023/0040834 A1* | 2/2023 | Haile | G06F 16/26 |

(Continued)

FOREIGN PATENT DOCUMENTS

| | | | | |
|---|---|---|---|---|
| CN | 117377970 A | * | 1/2024 | .......... G06F 18/2113 |
| DE | 112022001326 T5 | * | 2/2024 | .......... G06F 11/0751 |

*Primary Examiner* — Ali H. Cheema
(74) *Attorney, Agent, or Firm* — Fenwick & West LLP

(57) ABSTRACT

A data management system, method and computer-readable medium for data integration and quality control are described. In some implementations, a computer-implemented method comprises steps of receiving datasets from one or more data sources, storing the datasets belonging to a domain, checking data integrity of the datasets, performing a quality control check on the datasets, receiving selections from the domain on the datasets that are selected to be processed based on one or more reference libraries, processing one or more selected datasets based on the one or more reference libraries to create mapped data, integrating the mapped data with metadata to provide an integrated analysis, and causing to display, at a graphical user interface (GUI), real-time processing status for each of the one or more selected datasets.

16 Claims, 13 Drawing Sheets

(56) References Cited

U.S. PATENT DOCUMENTS

| | | | |
|---|---|---|---|
| 2023/0096118 A1* | 3/2023 | Ramsl | G06F 40/30 |
| | | | 707/736 |
| 2023/0136094 A1* | 5/2023 | Du | G06F 18/217 |
| | | | 705/7.31 |
| 2023/0289360 A1* | 9/2023 | Gattani | G06F 16/254 |
| 2024/0062101 A1* | 2/2024 | O'Hara | G06N 20/20 |
| 2024/0135402 A1* | 4/2024 | Cascio | G06Q 30/0631 |
| 2024/0169576 A1* | 5/2024 | Aydermir | G06Q 50/04 |
| 2024/0233894 A1* | 7/2024 | Culver | G16H 15/00 |
| 2024/0273414 A1* | 8/2024 | Waltinger | G06Q 10/06393 |
| 2025/0078091 A1* | 3/2025 | Munguia Tapia | G06N 20/00 |

* cited by examiner

12,204 files matched to 6,204 samples

Samples consist of matched FASTQ files. All matched files are grouped as samples for uploading.

16 filenames not matched
These filenames did not match any recognized formatting. To upload files with unrecognized name formats, upload a filename list (instructions follow).

3 samples missing files
These samples are missing paired files. To upload these files, add the missing pairs or remove.

Cancel  Continue

*FIG. 7A*

New Sample Set                                Reset  Save Changes
Set Up   Samples
                        Show          Sort By
                        | All Samples ◊ | | Sample Name ◊ |   Sample Set Up
Samples  no samples selected                              Selected FASTQ files are
                                                          automatically assigned
                                                          based on information in
                                                          their filenames. Files with
                                                          standard format names
       Select Remote or Local FastQ files (or drag & drop)  can still be matched via
                                                          All unmatched files will
                                                          be discarded.
                                                          ⇪ Upload List List Instructions

| Remote | Local | Remove All | ⇪ Report | ⇪ Upload All | ⚙ Process All |

*FIG. 7B*

⚗ All Samples (6,207)   🧪 6204 Ready to Upload   ⓘ 3 Samples with Issues

| Samples | ☐ 3 samples (3 files) | Show<br>All Sources ⇅ | Sort By<br>Sample Name ⇅ |
|---|---|---|---|
| ☐ > ⓘ ATH01_prep5_S302 | | Files<br>2 (1 pair) | 1 missing (view)  X |
| ☐ > ⓘ ATH01_prep5_S390 | | Files<br>2 (1 pair) | 1 missing (view)  X |
| ☐ > ⓘ ATH01_prep5_S1204 | | Files<br>2 (1 pair) | 1 missing (view)  X |

[Remote] [Local] [Remove All] [Report] [Upload All] [Process All]

Sample Set Up

[?] 16 File Names Not Matched   [View]

Selected FASTQ files are automatically assigned to samples based on information in their filenames. Files with non-standard format names can still be matched via list upload.
All matched files will e discarded.

[↑ Upload List]   List Instructions

Issues

All issues must be resolved to continue.

ⓘ 3 Samples Missing Files   [Remove]
Add missing pairs or remove samples

*FIG. 7C*

| [icon] | Status | Sample Set ID | FASTQ files | Uploaded v | Upload Complete | Integrity | Processing Complete | Actions |
|---|---|---|---|---|---|---|---|---|
| ⊗ | Error | S3242 | 4 | 8/5/2024 | Halted | Failed (2) | * | X |
| ◌ | Processing | S3241 | 1 of 3 | 8/5/2024 9:00 AM | 9/5/2024 9:00 AM | Passed | Est. 8/5/2024 9:00 AM | X |
| ⚠ | Paused | S3420 | 7 | 8/5/2024 9:00 AM | unknown | | unknown | X |
| ✓ | Ready for Review | S3241 | 1 | 8/5/2024 9:00 AM | 8/5/2024 | | 8/52024 9:00 AM | X |
| ✓ | Ready | S3241 | 1 | 8/5/2024 9:00 AM | 8/5/2024 9:00 AM | Passed | 8/5/2024 9:00 AM | X |

Cause Unknown

Error Details: S3242  [X]
⊗ Data Integrity Error (Checksum): sam02.fsq, sam.fsq
The application has detected possible errors in 2 of 4 uploaded files. These errors may have existed in the original file, or occurred during transmission.
Account: some.email@somecompany.com
Path: localhost
Uploaded: 8/5/2024 9:00 AM
Status Failed

| File | Size | Issue | Recommended Action |
|---|---|---|---|
| sam02.fsq | 1.2G | integrity failure (checksum) | retry upload |
| sam03.fsq | 1.1G | integrity failure (checksum) | retry upload |

✓ Recommended Action
Retry upload. If the problem reoccurs, the issue may exist in source file. If this is your second attempt, check source for corruption, viruses, or completion.

[Close] [Retry Upload]

Bad Source File

Error Details: S3242  [X]
⊗ Data Integrity Error (Checksum): sam02.fsq, sam.fsq
The application has detected possible errors in 2 of 4 source files.
Account: some.email@somecompany.com
Path: localhost
Uploaded: 8/5/2024 9:00 AM
Status Failed

| File | Size | Issue | Recommended Action |
|---|---|---|---|
| sam02.fsq | 1.2G | source integrity failure (checksum) | check source file |
| sam03.fsq | 1.1G | source integrity failure (checksum) | check source file |

✓ Recommended Action
Check source for corruption, viruses, or completion. Replace and retry upload.

[Close] [Retry Upload]

*FIG. 7E*

| Status | Samples Pro.. | Set Name | Platform | Source | Uploaded ∧ | Processing Complete | Quality |
|---|---|---|---|---|---|---|---|
| ⓘ | 0 of 1,554 | Upload_04 | Illumina | Illumina S1 | 09/22/24, 8:32 PM | 73% | - |
| ⓘ | 407 of 1,574 | Upload_03 | unknown | local upload | 09/21/24, 5:32 PM | - | Preliminary |

[All Active ⬍] ⚗ All Sets (21) ☐1 Empty ⬆1 Uploaded ◯1 Processing.. ✓2 Quality Review ✓18 Ready ⓘ2 Have Issues

FIG. 7F

| Status | Samples Pro.. | Set Name | Platform | Source | Uploaded ∧ | Processing Complete | Quality |
|---|---|---|---|---|---|---|---|
| 🗃 | 1,554 | Samples0.. | Illumina | Illumina S1 | 9/22/24, 8:32 PM | 09/24/24, 12:32 AM | High |
| 🗃 | 1,754 | OldSet323.. | unknown | local upload | 09/21/24, 5:32 PM | 09/23/24, 6:09 PM | Medium |

[Archived ⬍]

FIG. 7G

DATA INTEGRATION AND QUALITY CONTROL SYSTEM

BACKGROUND

In many industries today, effective data management has become essential for driving insights, decision-making, and operational efficiency. As organizations generate vast amounts of data from multiple sources, including cloud platforms, local servers, and distributed networks, the need for a system that can integrate, process, and analyze data is more critical than ever. Data management systems provide the infrastructure for collecting, storing, and maintaining data integrity across diverse formats, allowing organizations to harness the full potential of their datasets. These systems streamline data ingestion, quality checks, and alignment processes, ensuring that the data remains consistent, reliable, and ready for downstream applications. The capabilities of modern data management systems extend beyond simple storage and retrieval.

BRIEF DESCRIPTION OF THE DRAWINGS

FIG. 7A is a conceptual diagram illustrating various notifications and automated, in accordance with some embodiments.

FIG. 7B is a conceptual diagram illustrating an example GUI panel for upload data files to the data management system, in accordance with some embodiments.

FIG. 7C is a conceptual diagram illustrating issues with the uploaded data files, in accordance with some embodiments.

FIG. 7E is a conceptual diagram illustrating various report panels, in accordance with some embodiments.

FIG. 7F is a conceptual diagram illustrating a processing summary panel that provides an overview of ongoing or completed workflows, in accordance with some embodiments.

FIG. 7G is a conceptual diagram illustrating a processing summary panel that provides an overview of completed workflows, in accordance with some embodiments.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

This disclosure is related to various embodiments of a data management system designed for integrating and processing complex datasets. The data management system operates within an adaptable computing environment to facilitate high-throughput data analysis. The data management system includes a platform for collecting, managing, and analyzing data from various data sources, including cloud storage and local servers. The data management system performs multiple stages of processing, from initial data import, pre-processing, quality control checks to alignment, quantification, and integration of processed datasets.

The data management system also includes several advanced tools to streamline the user experience and enhance data processing efficiency. Features such as automated data ingestion, customizable pipelines, and a comprehensive user interface provide users with real-time insights into data quality, processing status, and system feedback. Machine learning models are integrated to facilitate predictive analytics and to improve data categorization based on unique physical signatures. The data management system supports collaborative research and can be tailored to individual organization domains, allowing users to generate insights from aggregated datasets while preserving data privacy and security. The data management system provides a versatile, end-to-end solution for small- and large-scale data integration, analysis, and interpretation, advancing capabilities.

System Overview

Figure 1:
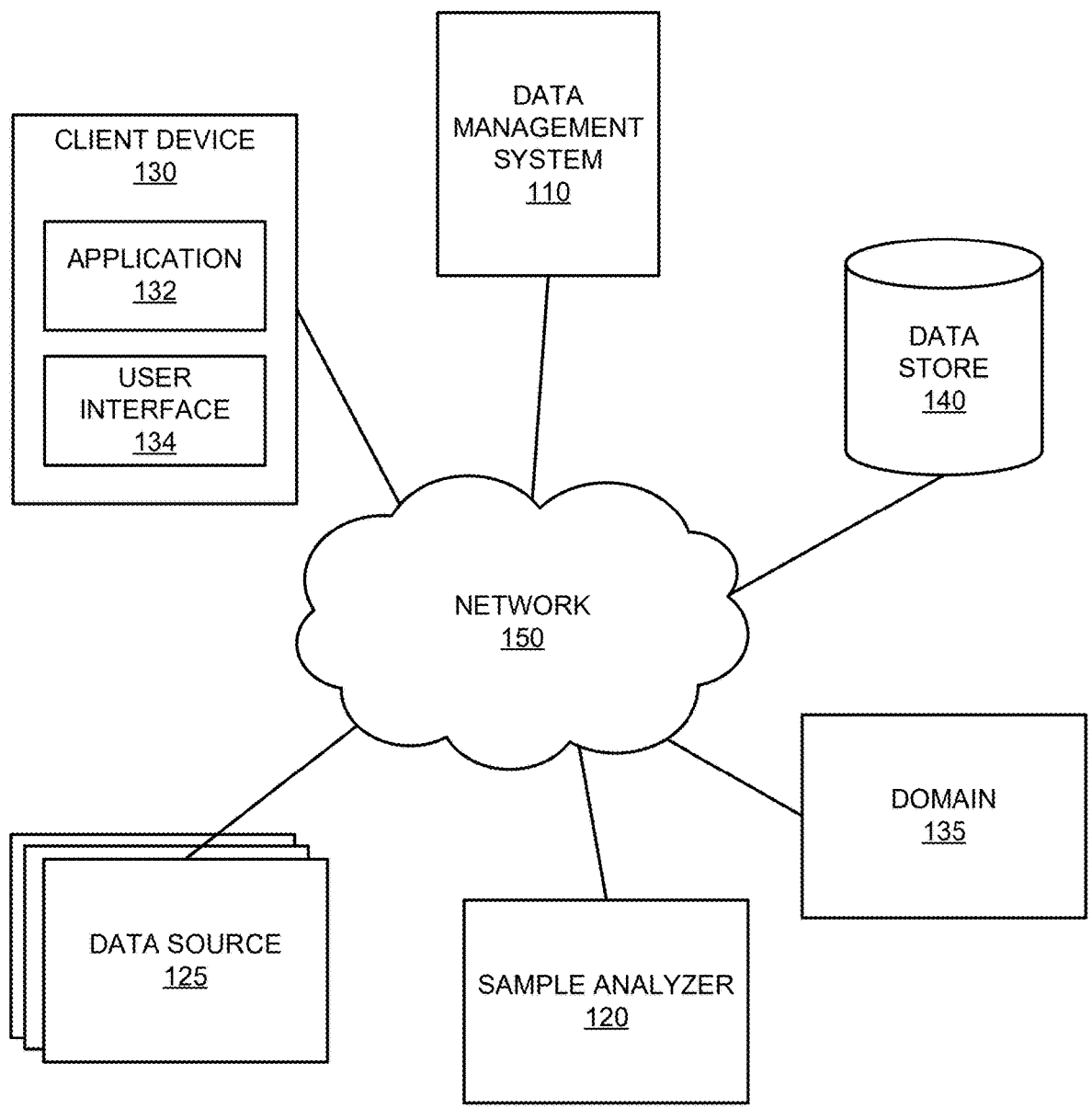
FIG. 1 is a block diagram illustrating an example data management system environment, in accordance with some embodiments.

Referring now to FIG. 1, shown is a block diagram illustrating an embodiment of an example system environment 100 for data integration and processing, in accordance with some embodiments. By way of example, the system environment 100 includes a data management system 110, a sample analyzer 120, data sources 125, client devices 130, an application 132, a user interface 134, and a data store 140. The entities and components in the system environment 100 may communicate with each other through network 150. In various embodiments, the system environment 100 may include fewer or additional components. The system environment 100 also may include different components.

The components in the system environment 100 may each correspond to a separate and independent entity or may be controlled by the same entity. For example, in some embodiments, the data management system 110 and an application 132 are operated by the same entity. In some embodiments, the data management system 110 and a sample analyzer 120 can be operated by different entities.

While each of the components in this disclosure is sometimes described in disclosure in a singular form, the system environment 100 and elsewhere in this disclosure may include one or more of each of the components. For example, there can be multiple client devices 130 that are in communication with the data management system 110. The data management system 110 may also collect data from multiple data sources 125. Likewise, while some of the components are described in a plural form, in some embodiments each of those components may have only a single instance in the system environment 100.

In some embodiments, the data management system 110 integrates raw data from various data sources 125 into a centralized platform. Raw data files may take various forms, such as raw sequence files, raw metadata files, raw analytics files, etc., and the files may take different formats, such as FastQ files, BAM files, VCF, TSV, CSV, and similar files. The data management system 110 may examine data integrity by examining each file's integrity using algorithms such as MD5, SHASUM, or ETag. If the data integrity check fails, the data management system 110 retrieves the data again and flags the data as corrupted if the mismatch persists.

In some embodiments, the data management system 110 may also be referred to as a centralized omics data management platform or simply a data management platform. While a centralized system is used as an example for this disclosure, in various embodiments, the data management system 110 may be centralized, decentralized, or distributed, depending on the specific implementation and requirements of the system, allowing for flexibility in managing data. A centralized data management platform is merely an example that is used for illustration. The data management system 110 may check data integrity of the omics datasets, which can be raw omics datasets or processed omics datasets. The data management system 110 may perform quality control checks on the omics datasets. A quality control check provides analysis on whether a region of an omics dataset passes a quality threshold for a downstream analysis. The data management system 110 may perform an alignment of a selected omics dataset to a reference library and a quality control analysis on the alignment. The data management system 110 may integrate an aligned omics dataset with additional omics dataset and metadata to provide an integrated omics analysis.

In some embodiments, the data management system 110 performs data pre-processing to clean and prepare the data for further analysis. Pre-processing may include quality control measures such as counting the relative frequency of nucleotides, summarizing the distribution of quality scores, and measuring the frequency of sequencing adapters and other contaminants. The data management system 110 may use various tools to perform these tasks to determine whether the data is suitable for downstream analysis. In some situations, the data management system 110 may indicate one or more issues in a dataset and allow the user to make a determination whether to continue further analysis.

In some embodiments, the data management system 110 may perform data processing by mapping the short sequence reads to reference genomes or proteomes. Data processing may include alignment, which may encompass mapping the reads, annotating the mapped reads, and estimating data modality abundance by read counting. The data management system 110 may use automated versions of alignment tools to perform these tasks. In some situations, data processing may be a long process. The data management system 110 may display the status of each file (queued, processing, finished) through the user interface 134.

In some embodiments, the data management system 110 performs data post-processing to analyze the processed data. Post-processing may include generating read mapping statistics, marking duplicate reads, creating coverage files for visualization, and assembling transcripts. The data management system 110 may use various tools to perform these tasks and display the results on quality control panels and sending notifications to users.

In various embodiments, the data management system 110 may take different suitable forms. For example, while the data management system 110 is described in a singular form, the data management system 110 may include one or more computers that operate independently, cooperatively, and/or in a distributed manner. The data management system 110 may be operated by one or more computing devices. The one or more computing devices includes one or more processors and memory configured to store executive instructions. The instructions, when executed by the one or more processors, cause the one or more processors to perform omics data management processes that centrally manage the omics datasets received from the one or more data sources.

By way of examples, in various embodiments, the data management system 110 may be a single server or a distributed system of servers that function collaboratively. In some embodiments, the data management system 110 may be implemented as a cloud-based service, a local server, or a hybrid system in both local and cloud environments. In some embodiments, the data management system 110 may be a server computer that includes one or more processors and memory that stores code instructions that are executed by one or more processors to perform various processes described herein. In some embodiments, the data management system 110 may also be referred to as a computing device or a computing server. In some embodiments, the data management system 110 may be a pool of computing devices that may be located at the same geographical location (e.g., a server room) or be distributed geographically (e.g., cloud computing, distributed computing, or in a virtual server network). In some embodiments, the data management system 110 may be a collection of servers that independently, cooperatively, and/or in a distributed manner provide various products and services described in this disclosure. The data management system 110 may also include one or more virtualization instances such as a container, a virtual machine, a virtual private server, a virtual kernel, or another suitable virtualization instance.

In some embodiments, one or more sample analyzers 120 may analyze various types of omics data. Omics data may include datasets that characterize and quantify pools of biological molecules, such as genes, transcripts, proteins, and metabolites. Each sample analyzer 120 may be configured to analyze a particular type of omics data, including but not limited to genomic data, transcriptomic data, proteomic data, metabolomic data, epigenomic data, metagenomic data, lipidomic data, glycomic data, and phosphoproteomic data.

In some embodiments, for genomic data analysis, the sample analyzer 120 may include techniques such as Polymerase Chain Reaction (PCR), Sanger sequencing, and Next-Generation Sequencing (NGS), microarray, single nucleotide polymorphism (SNP) genotyping. A sample analyzer 120 may use one or more of these techniques to amplify, sequence, and analyze DNA samples to identify genetic variations, mutations, and other genomic features. Genomic data may include gene sequences, expressive or non-expressive regions of the genome, single nucleotide polymorphisms (SNPs), structural variations, copy number variations (CNVs), methylation patterns, 5'-C-phosphate-G-3' (CpG) sites, and regulatory elements.

In some embodiments, to generate transcriptomic data from a biological sample, a sample analyzer 120 may utilize RNA sequencing (RNA-seq), microarray analysis, and quantitative PCR (qPCR). The sample analyzer 120 may study the expression levels of RNA transcripts produced by the genome under specific circumstances or in a specific cell. Transcriptomic data may include gene expression patterns and regulatory mechanisms.

In some embodiments, to generate proteomic data from a biological sample, a sample analyzer 120 may incorporate techniques such as mass spectrometry (MS), two-dimensional gel electrophoresis (2D-GE), and protein microarrays. Proteomic data may include data that identify and quantify proteins, protein-protein interactions, and post-translational modifications.

In some embodiments, to generate metabolomic data from a biological sample, a sample analyzer 120 may use techniques such as nuclear magnetic resonance (NMR) spectroscopy, gas chromatography-mass spectrometry (GC-MS), and liquid chromatography-mass spectrometry (LC-MS). Metabolomic data may include data related to metabolites and snapshots of the metabolic states of a biological sample.

In some embodiments, data sources 125 are the sources of various omics datasets. For example, a sample analyzer 120 may generate an omics dataset and is stored in a data source 125. Omics datasets may encompass a wide range of biological data, including genomic, transcriptomic, proteomic, and metabolomic data. Each data source 125 may be a distinct location where these datasets are stored. The data management system 110 receives and integrates various datasets in a centralized platform for further analysis.

In some embodiments, data sources 125 may be heterogeneous sources and may take different forms, such as desktop computers, servers, private cloud storage, and public cloud storage. For example, genomic data files may be stored on local servers within a research institution, while metadata files may be stored on individual desktop computers. The data management system 110 may pull data from heterogenous sources. In some embodiments, data sources 125 may also include public databases, academic databases, and clinical trial datasets.

In some embodiments, various data sources 125 may be geographically distributed in different locations and manners. For example, one data source 125 may belong to a sequencing center or bio-sample sequencing facility. These facilities may generate large volumes of raw data files, such as raw sequence files, raw metadata files, and raw analytics files. In some embodiments, data sources 125 may encompass public computing cloud providers, such as AWS, AZURE, and GCP (GOOGLE Cloud Provider). The data management system 110 may access and download data from data sources 125 on the cloud using secure authentication tokens and download permissions. In some embodiments, a data source 125 may be a local computer of a domain (e.g., an organization), which is a customer of the data management system 110.

In some embodiments, for receiving data from various data sources 125, the data management system 110 may include automated data-pulling engines that regularly check for new data availability. The data-pulling engines can be event-based or scheduled to pull data from the sources as soon as new data becomes available. After a dataset is retrieved, the data management system 110 may incorporate data integrity checks to ensure the accuracy and reliability of the datasets being integrated. The data management system 110 may generate and compare checksum files, such as MD5, SHASUM, or ETag, to verify data integrity during transmission and storage. If discrepancies are detected, the data management system 110 can flag the data as corrupted and alert the user through the user interface 134. The data management system 110 may be capable of integrating datasets from multiple sources simultaneously, supporting high-throughput data analysis and large-scale research projects.

In some embodiments, the client device 130 is a user device that interacts with the centralized data management platform provided by the data management system 110. The client device 130 allows users to upload, access, and analyze omics datasets through a user-friendly interface 134. the client device 130 may provide real-time notifications, data integrity status, and recommendations and receive feedback form the user. A client device 130 may be an electronic device controlled by a user who interacts with the data management system 110. In some embodiments, a client device 130 may be any electronic device capable of processing and displaying data. These devices may include, but are not limited to, personal computers, laptops, smartphones, tablet devices, or smartwatches.

In some embodiments, an application 132 is a software application that serves as a client-facing frontend for the data management system 110. An application 132 can display data management information and file integration status. An application 132 may offer features such as real-time data integrity checks, notifications, and alerts regarding the status of data uploads and integrations. Users can interact with the application 132 to view detailed metadata, perform quality control checks, and make decisions on data processing and analysis. Additionally, an application 132 may support secure login and authentication protocols to ensure that only authorized personnel can access sensitive data. The application 132 may also include visualization tools to help users interpret complex omics data. The application 132 may integrate with other software tools for advanced data analysis and reporting.

In some embodiments, a user interface 134 may be the interface of the application 132 and allow the user to perform various actions associated with application 132. For example, application 132 may be a software application, and the user interface 134 may be the front end. The user interface 134 may take different forms. In some embodiments, the user interface 134 is a graphical user interface (GUI) of a software application. In some embodiments, the front-end software application 132 is a software application that can be downloaded and installed on a client device 130 via, for example, an application store (App store) of the client device 130. In some embodiments, the front-end software application 132 takes the form of a webpage interface that allows users to perform actions through web browsers. A front-end software application includes a GUI 134 that displays various information and graphical elements. In some embodiments, the GUI may be the web interface of a software-as-a-service (SaaS) platform that is rendered by a web browser. In some embodiments, user interface 134 does not include graphical elements but communicates with a server or a node via other suitable ways, such as command windows or application program interfaces (APIs).

In some embodiments, the data management system 110 may integrate different data belonging to the same domain 135. For example, a company client can request the data management system 110 to integrate various omics data of the company. A domain 135 refers to an environment for a group of units and individuals to operate and to use domain knowledge to organize activities, information and entities related to the domain 135 in a specific way. An example of a domain 135 is an organization, such as a pharmaceutical company, a biotech company, a business, a research institute, or a subpart thereof and the data within it. A domain 135 can be associated with a specific domain knowledge ontology, which could include representations, naming, definitions of categories, properties, logics, and relationships among various omics data that are related to the research projects conducted within the domain. The boundary of a domain 135 may not completely overlap with the boundary of an organization. For example, a domain may be a research team within a company. In other situations, various research groups and institutes may share the same domain 135 for conducting a collaborative project.

One or more data stores 140 may be used to store various data used in the system environment 100, such as various omics data, metadata, and processed data. Metadata may encompass patient information, experimental conditions, sample identifiers, and sequencing parameters. Processed data may include aligned sequences, quantified gene expression levels, protein abundance data, and metabolite concentrations. In some embodiments, data stores 140 may be integrated with the data management system 110 to enable seamless data flow between storage and analysis components. The integration may facilitate automated data ingestion, preprocessing, processing, and post-processing workflows to prepare the data for downstream analyses.

A data store 140 includes one or more storage units, such as memory, that take the form of a non-transitory and non-volatile computer storage medium to store various data. The computer-readable storage medium is a medium that does not include a transitory medium, such as a propagating signal or a carrier wave. In one embodiment, the data store 140 communicates with other components by a network 150. This type of data store 140 may be referred to as a cloud storage server. Examples of compute cloud storage service providers may include AMAZON AWS, DROPBOX, RACKSPACE CLOUD FILES, AZURE, GOOGLE CLOUD STORAGE, etc. In some embodiments, instead of a cloud storage server, a data store 140 may be a storage device that is controlled and connected to a server, such as the data management system 110. For example, the data store 140 may take the form of memory (e.g., hard drives, flash memory, discs, ROMs, etc.) used by the server, such as storage devices in a storage server room that is operated by the server. The data store 140 might also support various data storage architectures, including block storage, object storage, or file storage systems. Additionally, it may include features like redundancy, data replication, and automated backup to ensure data integrity and availability. A data store 140 can be a database, data warehouse, data lake, etc.

The communications among the data management system 110, sample analyzer 120, data sources 125, client device 130, application 132, and data store 140 may be transmitted via a network 150. In some situations, a network 150 may be a local network. In some situations, a network 150 may be a public network such as the Internet. In one embodiment, the network 150 uses standard communications technologies and/or protocols. Thus, the network 150 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 150 also includes links and packet-switching networks such as the Internet.

Example Entropy Analysis System

Figure 2:
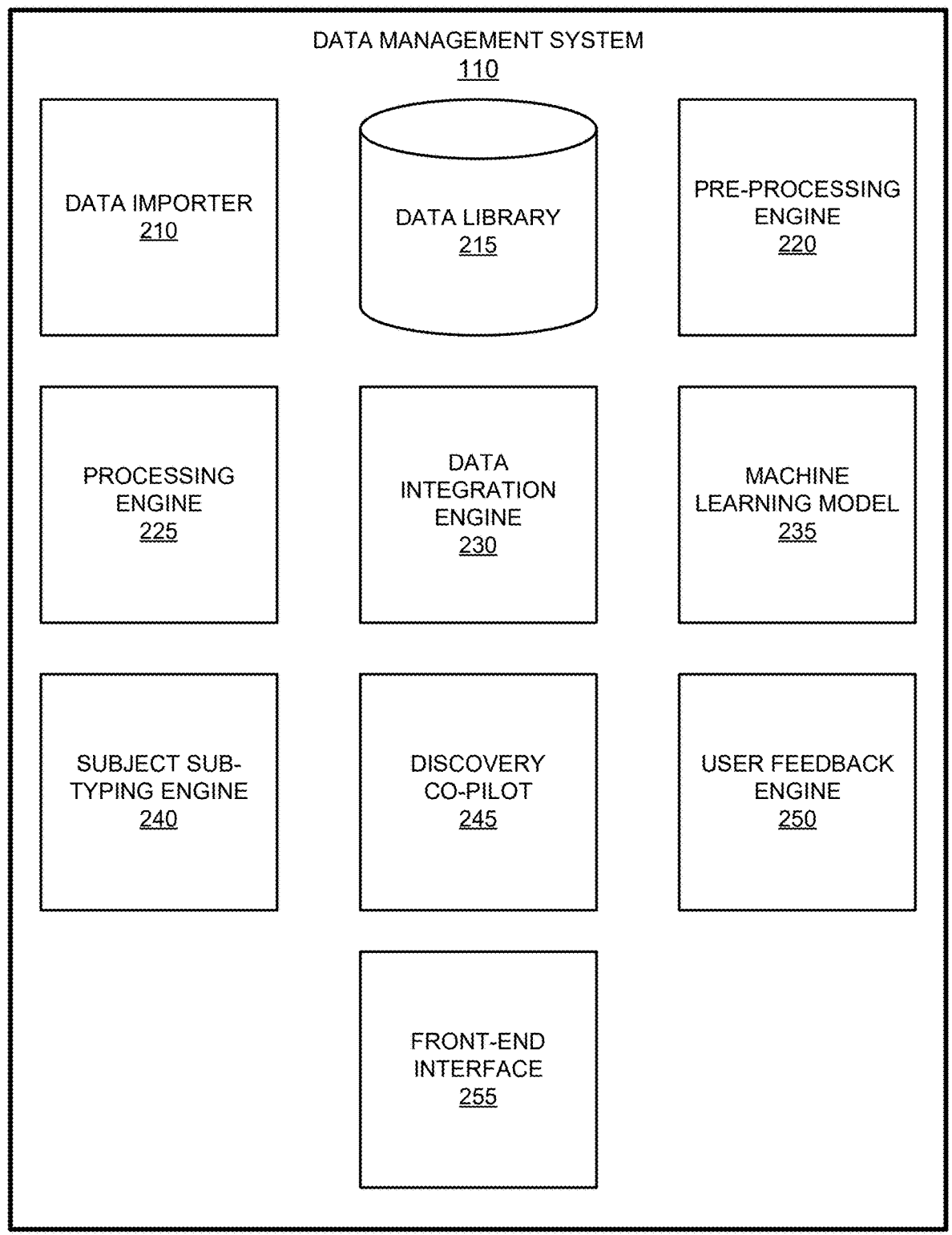
FIG. 2 is a block diagram illustrating various components of an example data management system, in accordance with some embodiments.

FIG. 2 is a block diagram illustrating various components of an example data management system 110, in accordance with some embodiments. A data management system 110 may include data importer 210, data library 215, pro-processing engine 220, processing engine 225, data integration engine 230, machine learning model 235, subject subtyping engine 240, discovery co-pilot 245, user feedback engine 250, and front-end interface 255. In various embodiments, the data management system 110 may include fewer or additional components. The data management system 110 also may include different components. The functions of various components in data management system 110 may be distributed in a different manner than described below. Moreover, while each of the components in FIG. 2 may be described in a singular form, the components may present in plurality.

In some embodiments, the data importer 210 is used to import various omics datasets from different data sources 125 into the data management system 110. The data importer 210 may also be referred to as data input connectors. The omics datasets can be raw omics datasets from a plurality of sources or other suitable omics datasets. The imported files may be raw data files, which may take various formats, such as FastQ files, BAM files, VCF files, CSV, TSV, and similar files. The data importer 210 may include different components that allow data to be imported to the data management system 110 in different manner. For example, in some embodiments, the data importer 210 may pull data from public cloud storage providers, such as AWS, AZURE, and GOOGLE CLOUD. Users may provide secure authentication tokens and download permissions, allowing the data importer 210 to access and retrieve the datasets from these cloud platforms. In some embodiments, the data importer 210 may support manual uploads from desktop computers or servers. Users can utilize a user interface 134 to drag-and-drop raw data files, such as raw sequence files, raw metadata files, and raw analytics files, into the data management system 110. In some embodiments, the data importer 210 may retrieve data from private cloud storage. Users can upload data from private cloud environments to the data management system 110 through data uploading APIs. In some embodiments, the data importer 210 may automate the data-pulling process from sequencing centers and bio-sample sequencing facilities. The data importer 210 can regularly check for new data availability and initiate the data retrieval process as soon as new datasets are ready.

In some embodiments, the data importer 210 may perform data integrity checks to verify the accuracy and reliability of the imported datasets. The data importer 210 may generate and compare checksum files, such as MD5, SHASUM, or ETag, to ensure that the data has not been corrupted during transmission or storage. If discrepancies are detected, the data importer 210 may flag the data as corrupted and alert the user through the user interface 134.

In some embodiments, the data importer 210 may support secure data transmission protocols to protect sensitive information. Data encryption may be employed during the transfer process to ensure that patient privacy and confidentiality are maintained. Additionally, permission controls may be implemented to restrict access to authorized personnel only.

In some embodiments, the data library 215 stores and manages various types of omics data, including genomic data, transcriptomic data, proteomic data, and metabolomic data. The data library 215 can be part of a data store that stores the omics datasets received from the data input connectors and identify the omics datasets as belonging to an organization domain. The data library 215 may serve as a centralized repository, allowing the data management system 110 to access historical and real-time data for continuous analysis. The stored data can be used for a wide range of applications, such as research studies, clinical trials, drug development, and personalized medicine. By maintaining a comprehensive collection of omics data, the data library 215 provides data for researchers and clinicians to perform longitudinal studies, track disease progression, and identify potential biomarkers. Additionally, the data library 215 may facilitate the integration of new datasets with existing data, allowing for comparative analyses and the discovery of novel insights. The centralized nature of the data library 215 ensures that all relevant data is readily accessible, reducing the time and effort required to locate and retrieve specific datasets.

In some embodiments, the data library 215 may support various data formats, including raw sequencing data, processed data, and metadata. Raw sequencing data may take forms such as raw sequence files, raw metadata files, and raw analytics files, with formats including FastQ files, BAM files, VCF, CSV, TSV, and similar files. Processed data may include aligned sequences, quantified gene expression levels, protein abundance data, and metabolite concentrations, which may be stored in formats like comma separated values (CSV) files or specialized bioinformatics formats. Metadata may encompass patient information, experimental conditions, sample identifiers, and sequencing parameters, providing essential context for the raw and processed data. The data library 215 may also implement robust data integrity checks, such as generating and verifying checksum files, to ensure the accuracy and reliability of the stored data. The data library 215 may integrate external data sources 125, such as public databases or clinical trial datasets, to enhance the scope and depth of the analysis.

The data can be stored in structured formats such as relational databases or unstructured data stores such as data lakes. In different embodiments, various data storage architectures may be used, like cloud-based storage, local servers, or hybrid systems, to ensure flexibility in data access and scalability. The data library 215 may include features for data redundancy, automated backup, and encryption to maintain data integrity and security. The data library 215 may take the form of a database, data warehouse, data lake, distributed storage system, cloud storage platform, file-based storage system, object storage, graph database, time-series database, or in-memory database, etc. The data library 215 allows the data management system 110 to process large datasets efficiently while ensuring data reliability.

In some embodiments, the pre-processing engine 220 may prepare raw data files for subsequent analysis. Raw data files may take various forms, such as raw sequence files, raw metadata files, raw analytics files, etc., and the files may take different formats, such as fastQ files, binary alignment map (BAM) files, virtual card format (VCF) files, TSV, and CSV files. The pre-processing engine 220 may perform several quality control (QC) steps to ensure that the data is clean and suitable for downstream processing. These steps may include removing technical confounders such a noise, listing sequencing errors, filtering out low-quality reads, and the like. The pre-processing engine 220 may automatically perform quality control checks on the raw omics datasets received from the data input module. For example, a quality control check may provide analysis on whether a region of an omics dataset passes a quality threshold for a downstream analysis.

For example, the pre-processing engine 220 may use tools such as FastQC to provide a quick overview of potential issues in the raw data, such as adapter contamination, low-quality base calls, and overrepresented sequences. Additionally, the pre-processing engine 220 may employ trimming tools to remove adapter sequences and low-quality bases from the raw data files. The engine may also perform read alignment to merge re-sequenced files and infer strandedness to make determinations whether the data is consistent and ready for further analysis.

In some embodiments, the pre-processing engine 220 may handle various types of omics data, including genomic, transcriptomic, proteomic, and metabolomic data. For genomic data, the pre-processing engine 220 may include tools for read alignment and duplicate removal, such as unique molecular identifiers (UMIs) tools for de-duplication based on molecular identifiers. For transcriptomic data, the pre-processing engine 220 may utilize RNA sequencing (RNA-seq) pipelines to assess read quality and infer strandedness. For proteomic data, the pre-processing engine 220 may incorporate mass spectrometry data processing tools to identify and quantify proteins. The pre-processing engine 220 may also include a recommendation engine, such as a chatbot, to assist users in making informed decisions about data quality and preprocessing steps. This recommendation engine may provide guidelines and suggestions based on the QC results, helping users to decide which samples to include in downstream analyses. The pre-processing engine 220 may be automated to enhance throughput and reduce human error. The pre-processing engine 220 generates consistent and reproducible results across large datasets.

In some embodiments, the processing engine 225 handles sequence alignment and quantification of various types of omics data. The processing engine 225 may perform an alignment of a selected omics dataset to a reference library and provide a quality control analysis on the alignment. Processing of data may involve mapping preprocessed reads to reference genomes or proteomes, annotating the mapped reads, and estimating the abundance of data modalities, such as transcripts, proteins, operational taxonomic units, or methylation levels. The processing engine 225 may utilize various algorithms and tools to achieve these tasks. For example, the processing engine 225 may employ sequence alignment tools, such as STAR for RNA sequencing data, and quantification tools, such as Salmon, to generate gene count files. The processed files are used for downstream analyses, such as differential expression analysis and gene enrichment studies.

In some embodiments, the processing engine 225 may be designed to handle different types of data formats and sources. For instance, the processing engine 225 may process raw data files. Additionally, the processing engine 225 may include features for real-time data processing and quality control, allowing users to monitor the status of data processing through a user interface 134. The processing engine 225 may also be equipped with advanced data processing capabilities, such as machine learning algorithms, to enhance the accuracy and efficiency of data processing. Furthermore, the processing engine 225 may support high-throughput data processing that enables the analysis of large volumes of samples simultaneously.

In some embodiments, the data integration engine 230 integrates various types of omics data to provide comprehensive insights. The data integration engine 230 may be part of the post-processing. The data integration engine 230 may integrate a processed omics dataset with additional omics dataset and metadata to provide an integrated omics analysis. The data integration engine 230 receives different processed datasets from the processing engine 225 and analyze the datasets collectively. The data integration engine 230 may apply data normalization techniques to standardize the data formats. The data integration engine 230 may provide a wide range of insights by combining various types of omics data and metadata. For example, the data integration engine 230 may provide comprehensive connections between genetic variations, gene expression patterns, protein interactions, metabolic states, and epigenetic modifications. The data integration engine 230 may also provide a holistic view for the identification of biomarkers, understanding of disease mechanisms, and discovery of potential therapeutic targets.

In some embodiments, the data integration engine 230 may also integrate metadata, such as patient data, clinical data, and other relevant information, with the omics data. Metadata may include patient demographics, medical history, experimental conditions, sample identifiers, and sequencing parameters. The data integration engine 230 may associate omics data files with their corresponding metadata attributes, such as age, gender, patient ID, disease type, diagnosis, and other relevant factors. The data integration engine 230 establishes connections between the biological data and the clinical or experimental context in which the processed data. For example, the integration of metadata, such as patient demographics, clinical history, and experimental conditions, enables the data integration engine 230 to correlate biological data with clinical outcomes, treatment responses, and environmental factors. The data integration engine 230 may analyze precision medicine approaches, guide drug development, and enhance the understanding of complex biological processes and disease etiology. The data integration engine 230 may also support high-throughput analysis, making it possible to derive population-level insights and conduct large-scale studies, such as epidemiological research and clinical trials.

In some embodiments, the data integration engine 230 may support user interaction through a user interface 134, allowing users to view the status of data integration, inspect metadata associations, and make decisions on data processing and analysis. The data integration engine 230 may also include built-in quality control measures, such as control samples and validation protocols, to ensure the accuracy and reliability of the integrated data. In some embodiments, the data integration engine 230 may be modular, allowing for the integration of various analytical techniques based on the specific requirements of the omics data being analyzed.

In some embodiments, one or more machine learning models 235 can enhance the analytical capabilities of the data management system 110 by identifying patterns and making predictions based on integrated omics data. A machine learning model 235 may be used to analyze genomic data, gene expression, protein levels, and other markers to detect correlations among various markers. This model can process large volumes of data to uncover hidden relationships and generate hypotheses for further investigation. For example, the machine learning model 235 may identify gene expression patterns that correlate with specific disease phenotypes or treatment responses and provide insights for precision medicine.

In some embodiments, the machine learning model 235 may provide real-time feedback and recommendations to users. For instance, the model may suggest potential biomarkers for further validation or recommend specific data processing steps based on the analysis results. The machine learning model 235 may also be used to enhance the quality control processes by identifying outliers and anomalies in the data to ensure the reliability of the integrated datasets. In some embodiments, a machine learning model 235 may support continuous learning and adaptation, allowing the model to improve the performance over time as more data becomes available. One or more in machine learning models 235 may be used in dynamic research environments where new data is constantly being generated. In some embodiments, a machine learning model 235 may also be designed to handle multi-omics data, integrating information from different omics layers, such as genomics, transcriptomics, proteomics, and metabolomics, to provide a comprehensive view of the biological research.

In some embodiments, the subject sub-typing engine 240 is a post-processing tool that categorizes patients into specific subtypes based on the processed omics data. This categorization may involve analyzing various types of omics data to identify unique molecular signatures and patterns. The subject sub-typing engine 240 may utilize advanced algorithms, including machine learning and statistical models, to perform the analysis. The sub-typing process may consider multiple factors, such as genetic mutations, gene expression levels, gene count data, protein abundance, and metabolite concentrations, to provide a comprehensive molecular profile for each subject.

In some embodiments, the subject sub-typing engine 240 may also define drug targets for each identified patient subtype. By analyzing the molecular profiles, the subject sub-typing engine 240 can pinpoint specific genes, proteins, or pathways that are altered in each subtype. These targets can then be used to design and develop personalized drugs tailored to the unique characteristics of each patient group. In some embodiments, the subject sub-typing engine 240 may support continuous monitoring of patients' responses to personalized treatments. By regularly updating the molecular profiles with new data, the subject sub-typing engine 240 can track changes over time and adjust the treatment strategies accordingly. This dynamic approach ensures that the treatments remain effective and are tailored to the evolving needs of the patients. The subject sub-typing engine 240 may also provide detailed reports and visualizations through the user interface 134 to allow clinicians and researchers to interpret the results and make informed decisions.

In some embodiments, the subject sub-typing engine 240 may employ various analytical techniques to enhance its performance. For instance, the subject sub-typing engine 240 may use clustering algorithms to group patients with similar molecular profiles, enabling the identification of distinct subtypes. The subject sub-typing engine 240 may also utilize dimensionality reduction techniques, such as principal component analysis (PCA) or t-distributed stochastic neighbor embedding (t-SNE), to visualize high-dimensional omics data in a more interpretable form. Additionally, the subject sub-typing engine 240 may incorporate network analysis to explore the interactions between genes, proteins, and metabolites, and the underlying biological mechanisms.

In some embodiments, the discovery co-pilot 245 serves as a biosystem AI within a data management system 110, which include user interface 134 as a drug discovery tool to provide insight into the drug discovery process using a data-driven approach. The discovery co-pilot 245 integrates multiple data types and sources to assist researchers in designing and optimizing experiments. For example, instead of relying solely on hypothesis-driven experiments, the discovery co-pilot 245 incorporates a feedback loop that leverages previous experimental data, including "failed" experiments, to refine subsequent experiments. The discovery co-pilot 245 may collect and process data from various stages, such as patient subtyping, target gene identification, protein structure synthesis, and chemical analysis of potential drugs. The discovery co-pilot 245 may also generate collections of gene and protein counts that can guide the drug discovery pipeline.

In some embodiments, the discovery co-pilot 245 may operate with different types of data, adapting to a variety of data inputs and formats to increase flexibility across various research stages. For instance, raw data files can include genomic sequences, proteomic data, and metadata related to patient profiles, which may be processed in formats such as FASTA or BAM files for omics data, or proprietary data formats for chemical and pharmacokinetic analyses. The discovery co-pilot 245 can analyze these inputs, whether numerical, textual, or image-based, through reinforcement learning algorithms that generate insights on experiment setups. These insights may vary across parameters like dosage, chemical solubility, and toxicity levels, informing subsequent experiment designs and target selection processes. The discovery co-pilot 245 may adapt its analyses based on data from both successful and unsuccessful experiments, continually refining the recommendations in line with evolving datasets.

In some embodiments, the user feedback engine 250 provides an interface to facilitate user interaction and feedback during various stages of data handling, including data pre-processing, data processing, and data post-processing. The user feedback engine 250 may include a chatbot or other user interface elements that allow users to provide input, report issues, and make decisions based on the data quality and integrity checks performed by the data management system 110. For instance, during the data pre-processing stage, the user feedback engine 250 may prompt users to review the quality control results of raw data files. Users can interact with the user feedback engine 250 to accept or reject specific data files based on the quality metrics provided to select data based on quality.

In the processing stage, the user feedback engine 250 may provide real-time updates on the status of data alignment, annotation, and quantification. Users can monitor these updates through the user interface 134 and provide feedback if any issues or discrepancies are detected. For example, if the data management system 110 flags certain data files as corrupted or incomplete, the user feedback engine 250 may prompt users to decide whether to reprocess the data, retrieve new data from the data sources 125, or proceed with the available data. This interactive approach allows users to have greater control over the data processing workflow and make informed decisions based on the system's feedback.

In some embodiments, the user feedback engine 250 may continue to facilitate user interaction during the data post-processing stage. After the data have been processed, the user feedback engine 250 may present users with the final quality control results, including metrics such as read mapping statistics, duplication rates, and coverage depth. Users can review these results and provide feedback on the data quality, which may be used to refine the post-processing algorithms and improve future data analyses.

In some embodiments, the user feedback engine 250 may support the integration of user feedback into the system's learning algorithms, enabling continuous improvement of the data management processes. For instance, if users consistently flag certain types of data as problematic, the user feedback engine 250 may automatically adjust the quality control thresholds or data handling protocols of the data management system 110 to address these issues proactively.

In some embodiments, the user feedback engine 250 may be designed to support various types of user interactions, including text-based chat, graphical user interfaces, and voice commands. The user feedback engine 250 may also include features such as automated notifications, alerts, and recommendations, guiding users through the data management process and helping them make informed decisions at each stage. For example, if the data management system 110 detects a high level of noise in the data files, the user feedback engine 250 may recommend specific preprocessing steps to mitigate the noise and improve data quality. By incorporating user feedback into the data management workflow, the user feedback engine 250 enhances the overall efficiency and accuracy of the data management system 110 and ensure that high-quality data are available for downstream analyses and decision-making.

The front-end interface 255 may be a software application interface that is provided and operated by the data management system 110. For example, the data management system 110 may provide a SaaS platform or a mobile application for users to manage data. The front-end interface 255 may display a centralized platform in managing the omics datasets, the processed omics dataset, and the integrated omics analysis. The front-end interface 255 creates a data management platform that allows a centralized management of the organization domain on the omics datasets, interpretation of patients' metadata, status of alignment processing of the selected omics datasets, and the comprehensive omics analysis.

In some embodiments, the front-end interface 255 may take the form of various types of applications. For instance, the front-end interface 255 may be a standalone mobile app that users can download and install on their smartphones or tablets to access and manage various omics data. In some embodiments, the front-end interface 255 may also be implemented as a web-based interface, accessible through standard web browsers.

The front-end interface 255 may take different forms. In one embodiment, the front-end interface 255 may control or be in communication with an application that is installed in a client device 130. For example, the application may be a cloud-based SaaS or a software application that can be downloaded in an application store (e.g., APPLE APP STORE, ANDROID STORE). The front-end interface 255 may be a front-end software application that can be installed, run, and/or displayed on a client device 130. The front-end interface 255 also may take the form of a webpage interface of the data management system 110 to allow clients to access data and results through web browsers. In some embodiments, the front-end interface 255 may not include graphical elements but may provide other ways to communicate, such as through APIs.

Data Integration and Processing

Figure 3:
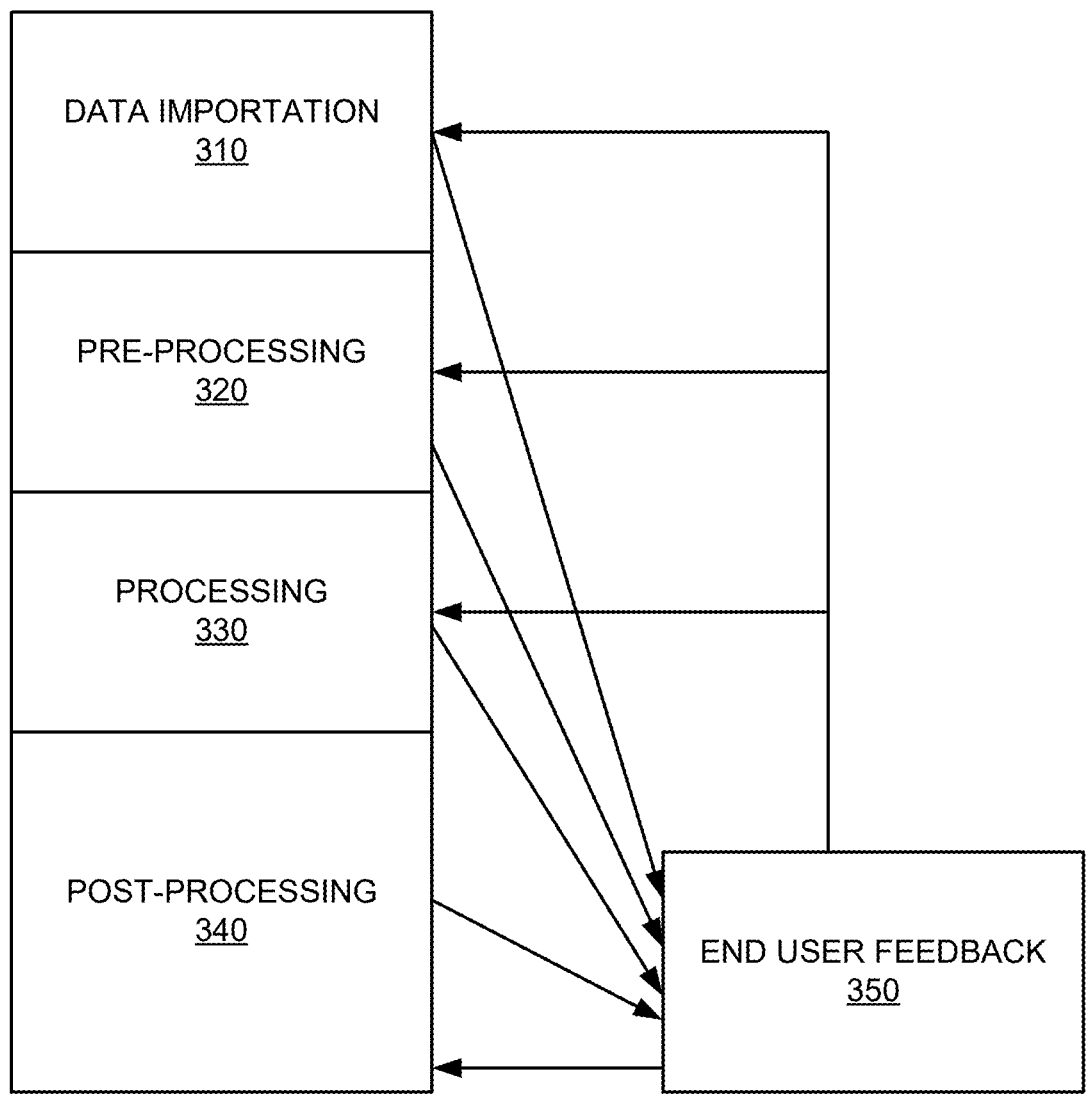
FIG. 3 is a block diagram illustrating a data integration and processing pipeline provided by the data management system, in accordance with some embodiments.

FIG. 3 is a block diagram illustrating a data integration and processing pipeline 300 provided by the data management system 110, in accordance with some embodiments. In some embodiments, in a data importation stage 310, the data management system 110 imports various data sources necessary for the analysis pipeline. The data importation stage 310 may be performed by the data importer 210. The data importation stage 310 may involve collecting data from various data sources 125, including raw omics data, prior research datasets, and metadata, including metadata related to the omics data and other data. The data management system 110 performs data integrity checks by validating the consistency and completeness of incoming data sources, verifying that data entries conform to expected formats, and cross-referencing data against known standards or reference datasets. This process may also include identifying and flagging any discrepancies or missing information to ensure that only reliable data proceed to subsequent stages of processing.

In some embodiments, in a pre-processing stage 320, the data management system 110 prepares imported data by performing pre-processing tasks to determine the quality and usability of the data for subsequent analyses. The pre-processing stage 320 may be performed by the pre-processing engine 220 and may involve cleaning raw omics data, such as transcriptomics and proteomics data, by removing noise or artifacts that could interfere with analysis. Additionally, the data management system 110 may standardize the data into uniform formats, applies initial transformations, and may use biological workflows to structure the data according to specific analytical requirements. The data management system 110 may also perform initial quality assessments to determine whether the data meet predefined thresholds before advancing to the processing stage.

In some embodiments, in a processing stage 330, the data management system 110 performs alignment and related processing to prepare data for analysis. The processing stage 330 may be performed by the processing engine 225 and include aligning omics data, such as genomic data, to reference genomes or proteomes to identify specific genes or proteins relevant to the research objectives. The alignment process provides data for mapping experimental data accurately and may include data related to the identification of patterns or target markers. The processing stage 330 may also include annotation processes that involve labeling aligned data with functional or structural metadata, providing context on biological significance or molecular properties. The data management system 110 may further perform data transformation tasks, such as scaling and normalization, to reduce variability across datasets, ensuring consistency in analytical outputs.

In some embodiments, in a post-processing stage 340, the data management system 110 integrates various types of omics data-such as transcriptomics, proteomics, and genomics-along with associated metadata to generate a holistic analysis across different biological factors and datasets. The post-processing stage 340 may be performed by various post-processing tools such as the data integration engine 230 and the subject sub-typing engine 240. Through data integration, the data management system 110 may produce a unified dataset where multiple layers of biological information are correlated and provide a holistic interpretation of the processed data. The post-processing stage 340 may also include interpreting patterns and relationships within the data. For example, the data management system 110 may identify potential biological interactions, pathways, or target biomarkers based on the combined data. In some embodiments, the post-processing stage 340 may involve generating structured summaries, visualizations, or reports that present the interpreted findings in a format accessible to researchers. The generated results and data allow for more informed decision-making in applications such as drug discovery or biomarker validation.

In some embodiments, the data management system 110 may receive user feedback 350 across stages 310, 320, 330, and 340. In some embodiments, each stage may use different feedback in a distinct way to enhance system performance and data accuracy. During the data importation stage 310, feedback may involve user input on data source selection or standards for data consistency, allowing the system to determine the handling of file corruption and issues in data importation. In the pre-processing stage 320, user feedback may guide adjustments in data cleaning parameters or transformations. The user may also determine whether to continue to proceed with a dataset that has a low-quality score determined in the pre-processing stage 320 for further processing. In the processing stage 330, feedback may be received to inform the alignment algorithms and filtering criteria. User may provide input to optimize alignment accuracy or adjust thresholds to maintain data integrity. In the post-processing stage 340, user feedback assists in refining data interpretation, such as enhancing annotation relevance or adjusting visualization outputs for clearer representation of biological insights.

Example Pre-Processing Stage

Figure 4:
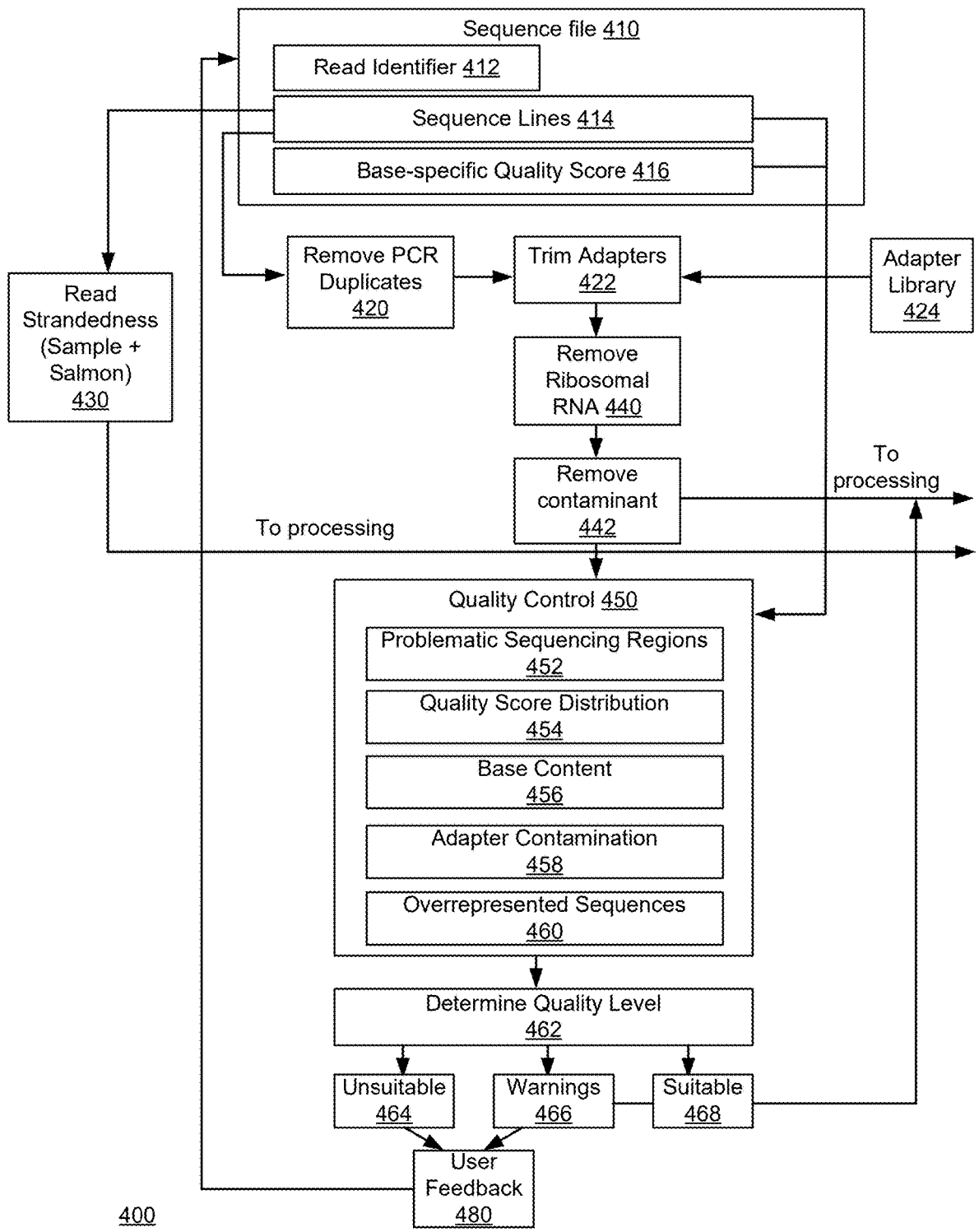
FIG. 4 is a block diagram illustrating details of an example pre-processing stage, in accordance with some embodiments.

FIG. 4 is a block diagram illustrating details of an example pre-processing stage 400, in accordance with some embodiments. The pre-processing stage 400 is an example of the pre-processing stage 320. In various embodiments, the pre-processing stage 400 may include additional, fewer, or different stages. The functionality of each stage may also be distributed differently from the discussion provided in the discussion of FIG. 4. The steps illustrated in FIG. 4 may also be performed in a different order as explicitly illustrated in FIG. 4.

In some embodiments, the data management system 110 receives a raw data file, which in some cases may be a raw sequence file 410. The sequence file 410 may include sequences generated from any sequencing techniques, such as a high-throughput sequencing (HTS) of biological samples such as cells, cell cultures, organoids, biopsies, tissue, stool, plasma, or blood. The sequence file 410 is typically formatted as a FastQ file but may also be in other formats such as Binary Alignment/Map (BAM), Sequence Alignment/Map (SAM), or Compressed Reference-oriented Alignment Map (CRAM).

The sequence file 410 may include various components, such as a read identifier 412, sequence lines 414, and base-specific quality score 416. The read identifier 412 may take the form of header information and includes various identifiers of the sequence file 410 and metadata of the sequence file 410. In some embodiments, the read identifier 412 provides metadata about each read, such as the machine that generated the data, the specific run or flow cell identifier, and additional technical parameters. This information allows tracking the origin of each read and ensures that each sequence can be attributed to its source.

The data management system 110 may analyze the main content of a sequence file 410, designated as the sequence line 414. The sequence line 414 contains the nucleotide sequence data (A, T, G, C) that corresponds to the sampled biological material. The sequence line 414 provides the primary data that will be mapped to a reference genome or used in various bioinformatics pipelines. This data serves as the primary source of omics data and is subsequently used in various analyses, such as gene expression profiling, taxonomic classification, and variant detection. Maintaining the integrity of the sequence line 414 helps prevent errors that can affect the analysis pipeline and lead to inaccurate interpretations.

The base-specific quality score 416 provides a measure of the confidence in the accuracy of each nucleotide in the sequence line 414. The quality scores are typically represented using the Phred scale, which assigns a numerical value to each base call, indicating the probability of an incorrect base call. The data management system 110 uses these scores to identify low-quality bases, which may indicate sequencing errors. This information is then applied in later quality control steps to filter or flag low-confidence data, improving the reliability of downstream analyses. The base-specific quality score 416 allows the data management system 110 to assess the reliability of the sequencing data and identify regions with low confidence, which may require further attention or filtering during preprocessing.

In some embodiments, at a PCR duplicate removal step 420, the data management system 110 removes PCR duplicates from the sequence data. PCR duplicates are multiple copies of the same original DNA fragment that are generated during the PCR amplification process. The data management system 110 removes duplicates to reduce biases and inaccuracies in downstream analyses.

In some embodiments, the data management system 110 employs a tool to identify and remove these PCR duplicates. One such tool is UMI-tools, which utilizes Unique Molecular Identifiers (UMIs) to distinguish between true biological duplicates and PCR duplicates. UMIs are short, random sequences that are added to each DNA fragment before PCR amplification. By comparing the UMIs of the sequenced reads, the data management system 110 can determine which reads are true duplicates and which are PCR duplicates. The process may begin with the extraction of UMI barcode information from the read sequence. The UMI barcode is then added to the read name, allowing the data management system 110 to track the origin of each read. After the UMI information is extracted, the data management system 110 de-duplicates the reads based on both the mapping information and the UMI barcode information. The data management system 110 generates a filtered BAM file, which contains only the unique reads after the removal of PCR duplicates. The PCR duplicate removal step 420 may be used for data generate from in high-throughput sequencing experiments, where the presence of PCR duplicates can significantly impact the interpretation of the data.

In some embodiments, at adapter trimming step 422, the data management system 110 trims adapter sequences from the sequence data. Adapters may include short synthetic DNA sequences that are ligated to the ends of DNA fragments during library preparation for sequencing. At adapter trimming step 422, The adapter sequences are removed from the reads before downstream analysis to avoid introducing biases and inaccuracies.

The data management system 110 may employ various tools to identify and trim these adapter sequences, such as tools TRIM GALORE!, which may detect and remove adapter sequences from the reads. The adapter trimming step 422 may begin with the identification of adapter sequences within the reads. The data management system 110 may use a predefined adapter library 424 to match and locate the adapter sequences in the reads. The predefined adapter library 424 contains the sequences of the adapters that were used during the library preparation. For example, the adapter library 424 includes known adapter sequences that are used in various sequencing protocols. The adapter library may include standard adapter sequences, such as the ILLUMINA adapters, as well as custom adapters that may have been used in specific experiments.

After the adapter sequences are identified within the reads, the data management system 110 trims the adapter sequences from the sequence line 414. The trimmed reads may then be outputted as new FastQ files, which can be used for downstream analysis. The data management system 110 may also perform a quality check on the trimmed reads to ensure that the adapter trimming process was successful and that the reads are of high quality.

In some embodiments, at stand reading step 430, the data management system 110 determines the read strandedness of the sequencing data. Read strandedness refers to the orientation of the RNA or DNA sequences relative to the reference genome. The data management system 110 may use a subsample of sequence file 410, such as the sequence lines 414, to infer read strandedness. The data management system 110 may use any suitable strand determination tools, such as SALMON, which can quantify transcript abundance from RNA-Seq data. SALMON can infer the strandedness of the reads by analyzing the sequence lines 414 and comparing the sequence lines 414 to the reference genome.

The data management system 110 may create subsample of the sequence file 410 using tools such as FQ SUBSAMPLE. This subsample is then fed into the strand determination tool, which analyzes the sequence data to determine the strandedness of the reads. In some embodiments, the strand determination tool uses a probabilistic model to infer the strandedness, taking into account the sequence composition and the alignment of the reads to the reference genome. The strandedness information is outputted to the processing stage.

In some embodiments, at the ribosomal RNA removal step 440, the data management system 110 removes ribosomal RNA (rRNA) from the sequence file 410. Ribosomal RNA is a type of RNA that is a component of the ribosome and is highly abundant in cells. The presence of rRNA in sequencing data can overshadow the detection of other RNA species and reduce the overall quality of the data. The data management system 110 may employ any suitable tool to identify and remove rRNA sequences from the sequence file 410. One such tool is SORTMERNA, which is a local sequence alignment tool designed for filtering, mapping, and OTU (Operational Taxonomic Unit) clustering. The system environment 100 may align the sequencing reads against a database of known rRNA sequences and remove the reads that match the rRNA sequences.

In some embodiments, the ribosomal RNA removal step 440 may begin with the alignment of the sequencing reads to an rRNA database. The data management system 110 uses a removal tool such as the SORTMERNA to perform this alignment, which involves comparing each read to the sequences in the rRNA database to determine if there is a match. After the alignment is complete, the data management system 110 filters out the reads that have been identified as rRNA. The identified reads are removed from the sequence file 410, leaving behind only the non-rRNA sequences. This filtered dataset can be used for downstream analyses. In some embodiments, the data management system 110 may also employ additional tools or methods to further refine the removal of rRNA. For example, the data management system 110 may use multiple reference databases or employ different alignment algorithms to improve the accuracy of rRNA detection and removal.

In some embodiments, at contaminant removal step 442, the data management system 110 removes contaminants from the sequence file 410. The contaminants in sequencing data can arise from various sources, including laboratory reagents, environmental contaminants, or cross-contamination between samples. Data generated from contaminants can create noise in the sequence file 410 and reduce the accuracy of downstream analyses.

The data management system 110 may employ any suitable genomic contaminant removal tools such as BBSPLIT to identify and remove contaminants. The data management system 110 may bin reads and maps the reads to multiple reference genomes simultaneously using BBMAP. The contaminant removal step 442 may begin by mapping each read to a set of reference genomes that represent potential contaminants. The reads are then assigned to the bin of the reference genome to which the reads are best mapped.

In some cases, reads may map to multiple reference genomes, indicating potential ambiguity. The data management system 110 handles these ambiguous reads by using disambiguation options provided by BBSPLIT. The options allow the data management system 110 to bin the ambiguous reads with all of the reference genomes, none of them, one of them, or place them in a special "ambiguous" file.

In some embodiments, paired reads are kept together during the contaminant removal step 442 to maintain the integrity of the sequence data in the sequence line 414. This step may be used in paired-end sequencing, where each read pair provides complementary information about the DNA fragment. By keeping paired reads together, the data management system 110 determines whether the removal of contaminants would disrupt the overall structure of the sequence data.

In some embodiments, based on the sequence lines 414, base-specific quality scores 416, and the amount of data removed from various stages such as adapter trimming step 422, ribosomal RNA removal step 440, and contaminant removal step 442, the data management system 110 may perform a quality control 450 analysis of the sequence file 410. The quality control 450 may encompass analyses such as problematic sequencing regions 452, quality score distribution 454, base content 456, adapter contamination 458, and overrepresented sequences 460.

In some embodiments, the quality control 450 may include problematic sequencing regions 452 within the sequence file 410. Problematic sequencing regions may be areas within the sequenced reads that exhibit anomalies or inconsistencies, which may arise due to technical errors during the sequencing process or inherent biological complexities. The data management system 110 utilizes various metrics and tools to detect the problematic sequencing regions, such as analyzing the distribution of quality scores across the reads and identifying regions with consistently low-quality scores. Additionally, the data management system 110 may employ algorithms to detect regions with high error rates, unexpected nucleotide compositions, or other irregular patterns. By identifying these problematic regions, the data management system 110 can flag the problematic regions for further inspection or potential exclusion from downstream analyses.

In some embodiments, the quality control 450 may include an analysis of the quality score distribution 454 across the sequence file 410. Quality scores may take the form of numerical values assigned to each base in a read, such as base-specific quality score 416, indicating the confidence in the accuracy of the base call. The data management system 110 may generate a quality score histogram that visualizes the distribution of these scores across all bases in the reads. This analysis helps in identifying bases with low-quality scores, which may suggest issues such as sequencing errors or degradation of the sample. The data management system 110 may use predefined thresholds to categorize the quality scores into different levels, such as high, medium, or low quality. By assessing the quality score distribution, the data management system 110 can determine the overall quality of the sequencing data and make informed decisions about the suitability of a sequence file 410 for downstream analyses.

In some embodiments, the quality control 450 may include evaluating the base content 456 of the sequence file 410. Base content analysis involves calculating the proportion of each of the four DNA bases (A, T, C, and G) at each position in the reads. The data management system 110 generates plots that display the percentage of each base across the length of the reads, allowing for the detection of any deviations from the expected base composition. Significant deviations may indicate issues such as contamination, sequencing biases, or errors in the sample preparation process. The data management system 110 may issue warnings or errors if the differences between the bases exceed certain thresholds. The data management system 110 may determine whether the sequencing data accurately reflects the biological sample and is free from technical artifacts.

In some embodiments, the quality control 450 may include assessing the extent of adapter contamination in a sequence file 410. If the adapter sequences are not properly trimmed at adapter trimming step 422, the adapter sequences can contaminate the sequencing reads and interfere with downstream analyses. The data management system 110 performs a comprehensive analysis to detect and quantify the presence of adapter sequences within the reads in adapter trimming step 422. The data management system 110 may issue warnings or errors if the level of adapter contamination exceeds predefined thresholds.

In some embodiments, the quality control 450 may include identifying overrepresented sequences within a sequence file 410. Overrepresented sequences are sequences that appear more frequently than expected in the dataset, which may indicate issues such as contamination, PCR amplification biases, or the presence of highly abundant biological sequences. The data management system 110 may generate a list of sequences that make up more than a certain percentage of the total reads, typically 0.1% or higher. The data management system 110 may issue warnings or errors if any sequence exceeds predefined thresholds for overrepresentation. This analysis helps in detecting and addressing potential sources of bias or contamination in the sequencing data. By identifying overrepresented sequences, the data management system 110 can take appropriate actions to mitigate the sequences' impact on downstream analyses.

The quality control 450 may be performed in two steps: first at the raw read level (before adapter trimming) and second at the trimmed read level (after adapter trimming).

In some embodiments, the data management system 110 estimates and provides, for both the raw and trimmed reads, general statistics that include the percent duplicated reads, the average percent GC content, the average read length, and the total number of sequences. This information is used to assess the overall quality and consistency of the sequencing data and to identify any potential issues related to sample preparation or sequencing processes.

In some embodiments, the data management system 110 calculates the per base sequence quality, which provides the range of quality values across all bases at each position in the FastQ file. The system generates a sequence quality histogram that presents the mean quality value across each base position, color-coded as green for passing sequences, orange for warnings, and red for sequences with errors. The data management system 110 issues a warning if the lower quartile for any base is less than 10 or if the median for any base is less than 25. The system raises an error if the lower quartile for any base is less than 5 or if the median for any base is less than 20. Users can inspect the histogram and use the recommendation chatbot for explanations and recommendations regarding any warnings or failures.

In some embodiments, the data management system 110 reports a score for per sequence quality to allow users to identify subsets of sequences with universally low quality values. A warning is raised if the most frequently observed mean quality is below 27 (indicating a 0.2% error rate), and an error is raised if the mean quality falls below 20 (indicating a 1% error rate).

In some embodiments, the data management system 110 analyzes the per base sequence content by plotting the proportion of each base (A, T, G, C) at each position in a file. A warning is issued if the difference between A and T, or G and C, exceeds 10% at any position, and an error is raised if this difference exceeds 20%.

In some embodiments, the data management system 110 calculates the per sequence GC content across the entire length of each sequence and compares it to a modeled normal distribution of GC content. A warning is issued if the deviation from the normal distribution represents more than 15% of the reads, and an error is raised if the deviation represents more than 30% of the reads.

In some embodiments, the data management system 110 evaluates the per base N content by plotting the percentage of base calls at each position for which an N was called. A warning is issued if any position shows an N content of over 5%, and an error is raised if this content exceeds 20%.

In some embodiments, the data management system 110 generates a sequence length distribution graph showing the distribution of fragment sizes in the analyzed file. A warning is issued if all sequences are not of the same length, and an error is raised if any sequences have a zero length.

In some embodiments, the data management system 110 counts the degree of duplication for each sequence in the library and creates a plot showing the relative number of sequences with different duplication levels. The system issues a warning if non-unique sequences constitute more than 20% of the total and raises an error if this proportion exceeds 50%. For RNA-Seq libraries, the system considers that sequences from different transcripts may vary significantly, resulting in high duplication. Distinctions between over-sequencing and technical duplication are made in downstream analyses, and the recommendation chatbot assists users with interpretation.

In some embodiments, the data management system 110 lists overrepresented sequences that make up more than 0.1% of the total. A warning is issued if any sequence represents more than 0.1% of the total, and an error is raised if it exceeds 1%. This module is often triggered when analyzing small RNA libraries, where sequences may be overrepresented naturally, and the recommendation chatbot assists users in understanding these cases.

In some embodiments, the data management system 110 conducts an adapter content analysis by examining K-mers in the library to identify uneven coverage across read lengths. Sources of bias, such as read-through adapter sequences, are identified, with warnings issued if any sequence appears in more than 5% of reads and errors raised if it exceeds 10%.

In some embodiments, the data management system 110 assigns a status for each section of the quality report, using color-coded indicators to signify normal (green), slightly abnormal (orange), or very unusual (red) results. Although the analysis appears as a pass/fail result, the system's evaluations must be interpreted in the context of the library's expected characteristics. A heatmap summarizes the information for a quick overview, and users, with the support of the recommendation chatbot, can decide where to focus their attention based on the summary evaluations. Specific guidance for interpreting each module's output is available in the report, documentation, and through the chatbot interaction.

In some embodiments, at quality level determination step 462, the data management system 110 determines the quality level of a sequence file 410 by aggregating various quality metrics and assigning one of the predefined quality levels to each sequence file 410. The quality levels can be categorized as unsuitable 464, warnings 466, and suitable 468.

At quality level determination step 462, the data management system 110 may begin by collecting quality metrics from the quality control step 450. These metrics include problematic sequencing regions 452, quality score distribution 454, base content 456, adapter contamination 458, and overrepresented sequences 460. Each of these metrics provides a different aspect of the data quality, and together the metrics offer a comprehensive view of the sequencing data's overall quality. For instance, problematic sequencing regions 452 identify areas in the sequence that may have errors or inconsistencies, while quality score distribution 454 assesses the overall quality of the base calls across the sequence.

After the quality metrics are collected, the data management system 110 uses a predefined set of thresholds and criteria to evaluate the data. The thresholds may be based on widely accepted standards in the field of sequencing and are designed to identify data that may be problematic for downstream analyses. For example, a sequence file 410 may be deemed unsuitable 464 if the sequence file 410 has a high percentage of low-quality base calls, significant adapter contamination, or a large number of overrepresented sequences. Conversely, a sequence file 410 may be classified as suitable 468 if it meets all the quality criteria and shows no significant issues. If the sequence file 410 is determined to be suitable for downstream processing, the sequence file 410, trimmed and contaminant removed, will be transmitted for processing.

In some embodiments, the data management system 110 assigns a warnings 466 level. This level indicates that the data has some quality issues that may not be severe enough to render the sequence file 410 completely unusable but still warrant caution. The warnings 466 level allows users to make informed decisions about whether to proceed with the data or take corrective actions.

The assignment of quality levels may be an automated process, but the data management system 110 also allows for user interaction and user feedback 480. Users can review the quality metrics and the assigned quality levels through a user interface. In some embodiments, the data management system 110 may provide the option to override the automated decisions if necessary. The data management system 110 also generates notifications and reports to keep users informed about the quality status of the sequencing data.

In some embodiments, the data management system 110 provides pre-processing quality control results 450 and receives user feedback 480 of the sequence file 410. The received user feedback 480 can enhance user interaction and ensure that the data meets the specific needs and expectations of the users.

The data management system 110 may display the QC results 450 on a user interface. These results include detailed metrics from the quality control stage, such as problematic sequencing regions 452, quality score distribution 454, base content 456, adapter contamination 458, and overrepresented sequences 460. Users can review these metrics to gain a comprehensive understanding of the data quality. The data management system 110 may generate notifications and reports, which may be displayed in a user interface 134 and additionally or alternatively sent to users via email or text.

Upon receiving the quality control results 450, users have the option to provide feedback through the user interface 134. This feedback can include decisions on whether to proceed with the data as is, request reprocessing, or exclude certain samples from downstream analyses. For example, if the quality control results 450 indicate significant adapter contamination 458, a user may choose to reprocess the data to trim the adapters more stringently. Alternatively, if the data shows a high percentage of low-quality base calls, the user may decide to exclude those samples from further analysis to avoid potential biases.

In some embodiments, the data management system 110 may also provide a recommendation engine, which may be implemented as a chatbot, to assist users in interpreting the quality control results 450 and making informed decisions. The chatbot provides guidelines and suggestions based on the identified quality issues, helping users understand the potential impact on their analyses and offering recommendations for corrective actions. For instance, if the data management system 110 detects overrepresented sequences 460, the chatbot may suggest specific filtering steps to mitigate this issue.

After receiving user feedback, the data management system 110 can take various actions based on the user's input. One possible action is to automatically reprocess the sequence file 410 according to the user's specifications. For example, if a user requests more stringent adapter trimming, the data management system 110 will re-run the trimming process with adjusted parameters. Another action could be to exclude certain samples from downstream analyses based on the user's decision. The data management system 110 will update the sample list accordingly and proceed with the analysis of only the selected samples.

In some embodiments, users may choose to proceed or not for further analysis based on the automated quality level assignments made at user feedback step 480. For example, if a sequence file 410 is assigned a warning 466 level or an unsuitable 464 level, but the user deems it suitable for further specific analysis, the user can decide to proceed for downstream analysis. The data management system 110 will then proceed with the data as per the user's decision.

Any pre-processed sequence files 410 that the user decides to proceed to the further processing will be sent to the processing stage 330.

Figure 5:
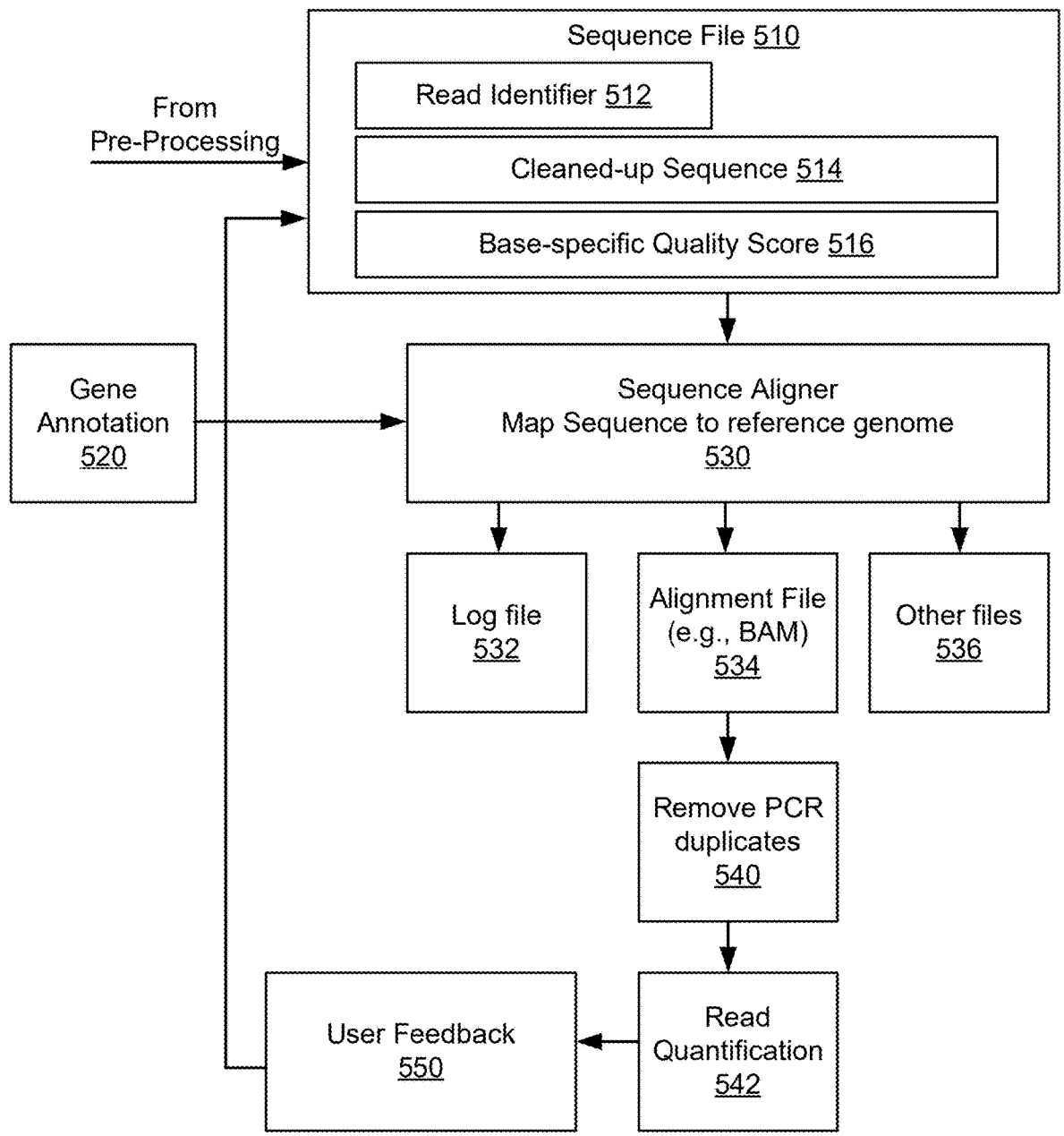
FIG. 5 is a block diagram illustrating details of an example processing stage, in accordance with some embodiments.

In some embodiments, the pre-processing stage 400 may include multiple omes pipelines. The data management system 110 may include pipelines and tools to analyze different molecular data modalities such as trascriptomics, proteomics, metagenomics, and epigenomics. Example Processing Stage FIG. 5 is a block diagram illustrating details of an example processing stage 500, in accordance with some embodiments. The processing stage 500 is an example of the processing stage 330. In various embodiments, the processing stage 500 may include additional, fewer, or different stages. The functionality of each stage may also be distributed differently from the discussion provided in the discussion of FIG. 5. The steps illustrated in FIG. 5 may also be performed in a different order as explicitly illustrated in FIG. 5.

In some embodiments, at the processing stage 500, the data management system 110 receives a sequence file 510. The sequence file 510 may be raw data file 410 that is pre-processed at the pre-processing stage 400, including such as PCR duplicate removal 420, adapter trim 422, and rRNA and contaminant removal 440 and 442. The sequence file 510 is typically formatted as a FastQ file. Similar to the sequence file 410, the sequence file 510 may include various components, such as a read identifier 512, cleaned-up sequence lines 514, and base-specific quality score 516.

In some embodiments, the processing stage 500 may include a gene annotation step 520. The data management system 110 may associate the mapped sequence reads with known genomic features. This step may include identification and labeling of genes, exons, introns, and other genomic elements within the aligned sequences. The data management system 110 may utilize a gene annotation file, typically in GTF (Gene Transfer Format), which contains detailed information about the genomic features and their coordinates on the reference genome. The data management system 110 may access the GTF file to retrieve the annotation data. This file may include information such as gene names, transcript IDs, exon boundaries, and other relevant genomic features. By cross-referencing the aligned reads with the coordinates provided in the GTF file, the data management system 110 can assign each read to its corresponding genomic feature.

In some embodiments, the data management system 110 may employ specialized tools to facilitate the gene annotation process. For instance, the STAR aligner, which is used for mapping reads to the reference genome, can also incorporate the GTF file to enhance the precision of spliced junction mapping. The data management system 110 may determine whether the reads are correctly annotated with the appropriate gene and transcript information, such as in the presence of spliced sequences. The annotated reads are then compiled into an output file, which may be in BAM (Binary Alignment Map) format. The file contains the aligned reads along with the associated genomic coordinates. The file may be used in various downstream analyses, such as differential expression analysis and gene enrichment studies.

The data management system 110 improves the mapping of omics data. In transcriptomics data analysis, the detection and characterization of spliced transcripts is complicated and computationally intensive because the process demands accurate alignment of reads that contain mismatches, such as insertions and deletions caused by genomic variations and sequencing errors. Also, the process involves mapping sequences derived from non-contiguous genomic regions comprising spliced sequence modules that are joined together to form spliced RNAs. The alignment challenges are further compounded by the presence of multiple copies of identical or related genomic sequences that are themselves transcribed, making precise mapping difficult.

In some embodiments, at processing stage 500, the data management system 110 automatically performs the sequence alignment 530 to the reference genome by mapping the cleaned-up sequence lines 514 (e.g., pre-processed) to a reference genome. In some embodiments, the sequence alignment step 530 includes mapping tens of thousands or millions of short sequence reads to the reference genomes. The data management system 110 may utilize an alignment tool, such as the STAR aligner, to facilitate this process. In the sequence alignment step 530, the data management system 110 receives cleaned-up sequence reads 514 and the corresponding base-specific quality scores 516. The alignment tool takes the sequence reads and maps them to the reference genome by comparing the read sequences to the reference sequences. This comparison involves finding the best match for each read, taking into account possible mismatches, insertions, and deletions that may arise due to genomic variations or sequencing errors.

In some embodiments, the data management system 110 may incorporate a gene annotation file from the gene annotation step 520, typically in GTF format, during the alignment process. The gene annotation file contains detailed information about the genomic features and the corresponding coordinates on the reference genome. By integrating the gene annotation file, the data management system 110 enhances the precision of spliced junction mapping and determine whether the reads spanning exon-exon junctions are accurately aligned.

The alignment process generates an output alignment file 534, commonly in BAM (Binary Alignment Map) format. The output alignment file 534 contains the aligned reads along with the mapping information. The file is structured to include details such as the read identifier, the position of the read on the reference genome, and the alignment quality score. The data management system 110 ensures that the BAM file is properly formatted and indexed to facilitate efficient access and downstream analyses.

In some embodiments, the data management system 110 may produce a log file 532 that documents the alignment process. This log file includes information about the alignment parameters used, the number of reads processed, and any issues encountered during the alignment. Additionally, other auxiliary files 536 may be generated to provide supplementary information, such as alignment statistics and quality metrics.

In some embodiments, the data management system 110 further performs the removal of PCR duplicates 540. The data management system 110 eliminates redundant reads that arise from PCR amplification during the sequencing library preparation process. PCR duplicates can introduce biases in downstream analyses, such as in read quantification and differential expression analysis, by artificially inflating the read counts for certain sequences.

The removal of PCR duplicates may be based on input of the alignment file 534. The data management system 110 may use tools, such as UMI-tools, to identify and remove these duplicates. UMI-tools leverage unique molecular identifiers (UMIs) that are incorporated into the sequence reads during library preparation. These UMIs serve as unique barcodes for each original DNA fragment, allowing the data management system 110 to distinguish between true biological duplicates and PCR duplicates.

In some embodiments, the data management system 110 processes the aligned reads by first grouping the reads based on the reads' mapping positions and UMI barcodes. Reads that share the same mapping position and UMI barcode are considered PCR duplicates. The data management system 110 may retain only one representative read from each group. In the deduplication process, a original DNA fragment may be counted only once to reduce the bias introduced by PCR amplification.

The output of the deduplication process is a filtered BAM file, which contains the deduplicated reads. This file is structured to include details such as the read identifier, the position of the read on the reference genome, and the alignment quality score. The data management system 110 may format and index the filtered BAM file to facilitate efficient access and downstream analyses. In some embodiments, the data management system 110 also generates a log file 532 that documents the deduplication process. The log file may include information about the number of processed reads, the number of duplicates identified and removed, and any issues encountered during the deduplication.

In some embodiments, the data management system 110 automatically performs read quantification 542 to quantify abundance of various genomic features, such as genes, transcripts, proteins, operational taxonomic units, methylation levels), within the sequence file 510 by read counting. The read quantification process may be based on the deduplicated alignment file 540. The data management system 110 may read quantifier tools, such as SALMON, to perform the quantification. For example, SALMON efficiently and accurately estimates transcript abundances from RNA-Seq data by leveraging advanced statistical models and algorithms.

In some embodiments, the data management system 110 processes the aligned reads by first indexing the reference transcriptome, which includes the sequences of all known transcripts. This indexing step allows SALMON to quickly map the reads to the reference transcripts and calculate the expression levels. The data management system 110 then uses the indexed reference transcriptome and the aligned reads to perform the quantification.

During the quantification process, the data management system 110 assigns each read to its corresponding transcript based on the alignment information. The data management system 110 may employ a probabilistic model to account for various sources of bias, such as sequence-specific biases and fragment length distributions, ensuring accurate quantification. The data management system 110 calculates the expression levels of each transcript by counting the number of reads that map to a transcript region and normalizing these counts to account for differences in sequencing depth and transcript length. The output of the read quantification process may include a set of gene count files, which contain the estimated expression levels of each transcript or gene. These files are structured to include details such as the transcript or gene identifier, the raw read counts, and the normalized expression values.

In some embodiments, the various steps in the processing stage 500 can take a long time (hours or days) to complete, depending on the number of samples and depth of sequencing. During the processing stage 500, the user interface 134 displays the correspond status (queued, processing, finished) for each sequence file 510.

In some embodiments, the data management system 110 incorporates user feedback 550 to refine and optimize the processing stage 500. The data management system 110 provides users with access to intermediate results and quality control metrics through a user interface 134. This interface displays the status of each file (e.g., queued, processing, finished) and presents the results in a structured manner. After the processing stage 500 is completed, a user interface 134 may display the results on a quality control panels and the data management system 110 may send notifications through emails and/or text to users. The data management system 110 allows users to review the alignment results, gene annotations, and quantification data. Users can inspect the intermediate files, such as the alignment files 534, log files 532, and other auxiliary files 536, to evaluate the quality and accuracy of the processing steps.

Based on the review of the intermediate results, users can provide feedback to the data management system 110. This feedback may include requests for reprocessing the data with different parameters, adjustments to the alignment or quantification criteria, or the selection of specific data subsets for further analysis. The data management system 110 captures this feedback through the user interface and incorporates the feedback into the processing workflow. In some embodiments, the data management system 110 allows users to decide how to proceed if the results produced do not meet the alignment and quantification criteria. For instance, if the alignment results are not satisfactory, users can choose to re-run the alignment with modified parameters without needing to repeat the entire experiment. The user feedback system allows the users to have control on the intermediate results, such as the output alignment file 534, the log file 532, and other auxiliary files 536. These files are used for inspection, evaluation, and downstream differential expression and gene enrichment/network analyses.

In some embodiments, the processing stage 500 may be applied primarily to transcriptomics. Transcriptomics is the study of the transcriptome using high-throughput methods such as next generation high throughput sequencing. The resulting digitized data include hundreds of millions of short (50 nt) to medium (250 nt) length sequences (reads) that are stored in FastQ files, which are the common standard for storing the output of high-throughput sequencing instruments. The FastQ format is a text-based format for storing both a biological sequence and its corresponding quality scores. Both the sequence letter and quality score are each encoded with a single, in the case of quality score ASCII, character for brevity.

The transcriptome is an important component to understand normalcy and disease from cells to tissue and the organism. Transcriptomes are dynamic and offer a finely-painted picture of the cell, tissue, and organismal status as they respond to triggers such as diseases, infections, treatments, lifestyle, diet, stress, pollution, etc. Transcriptomes are sensitive indicators of real-world triggers, allow understanding of biological mechanisms at the cellular level, and are used for identification of novel drug/gene targets, prognostic or diagnostic biomarkers and drug mechanisms of action.

By generating, analyzing, and modeling transcriptome (and other molecular omes such as proteomes, metabolomes, metagenomes, metatranscriptomes, epigenomes, etc.) data from individuals (patients and or healthy individuals), the data management system 110 generate molecular portraits of the individuals. A molecular portrait includes biological features at the molecular level. Such knowledge is used for subtyping patients and for defining drug targets for each patient subtype, designing and developing personalized drugs for complex and chronic diseases, and monitoring patient's response to chosen personalized treatments.

By generating, analyzing, and modeling envirome, socialome (environmental/social exposures that individuals encounter), and related ome data from individuals, the data management system 110 also generate environmental/social portraits for individuals. The environmental/social portraits include features at the external and social level. Such processed data can be applied to many fields such epidemiology, toxicology, and public health, and can lead to significant advances in the understanding of disease etiology and prevention, as well as accurate assessment of disease risk, identification of intervention strategies, and information/advice of public health policies.

Example Post-Processing Stage

In some embodiments, the data management system 110 performs post-processing on omics data files after the omics data files are processed at the pre-processing stage 320, such as mapping and quantification, to generate gene count files. The data management system 110 may examine these gene count files to assess their suitability for further analysis in downstream pipelines.

To automate the post-processing workflows, the data management system 110 sets up toolkits and computing infrastructure to support various post-processing tools. Specifically, the data management system 110 integrates software tools such as SAMTools and Picard for efficient handling and manipulation of sequencing data formats, including SAM (Sequence Alignment/Map) and BAM (Binary Alignment/Map) files. SAMTools processes BAM files by sorting the BAM files by coordinate, indexing them, and generating read mapping statistics, enabling efficient data access and facilitating the assessment of read alignment quality. Picard's MarkDuplicates tool identifies duplicate reads, marking them within the alignment data to indicate duplication levels without physically removing them. In RNA-seq data, this step is automated to skip removal of duplicates unless unique molecular identifiers (UMIs) are employed.

In some embodiments, the data management system 110 utilizes Picard, a suite of command-line tools, to handle high-throughput sequencing (HTS) data stored in formats such as SAM (Sequence Alignment/Map), BAM (Binary Alignment/Map), CRAM (Compressed Reference-oriented Alignment Map), and VCF (Variant Call Format). These formats provide structured storage of sequencing reads and related metadata, facilitating efficient data manipulation and analysis across various bioinformatics workflows.

For BAM files, which store alignment information in a compact binary format, the data management system 110 also generates a companion BAM index file, referred to as a BAI file. The BAI file is significantly smaller than the BAM file and acts as an indexing "table of contents" for the BAM file, providing quick access to specific reads or regions within the larger BAM dataset. Since the location of reads in a BAM file may change when the file is sorted by coordinate, the data management system 110 ensures that the BAM index file is created or regenerated after sorting operations. This index file enables downstream applications to quickly retrieve data from specific genomic regions without scanning the entire BAM file, optimizing both performance and resource use.

In some embodiments, the data management system 110 may use tools like SAMTools or Picard to create or update BAI files, ensuring they accompany their corresponding BAM files within the same directory. Many software tools that process BAM files rely on the presence of the BAI file to perform region-specific queries and analyses efficiently. As a result, the data management system 110 maintains the necessary file structure and ensures that the BAI file is accessible alongside each BAM file, supporting seamless integration with various downstream analysis applications that depend on indexed BAM data.

In some embodiments, the data management system 110 automates the integration of these post-processing tools within its infrastructure. For instance, the data management system 110 uses BEDTools to create bedGraph coverage files for visualization in genome browsers, converts these files to bigWig format via bedGraphToBigWig, and generates transcript assembly and quantification through StringTie. QualiMap is used to analyze BAM files (sorted by coordinate) to classify mapped reads by genomic region and coverage depth, while DupRadar provides statistics on duplication rates using marked duplicates from Picard. Additional tools, such as RSeQC and MultiQC, are employed to produce comprehensive QC reports that provide insights into data quality across various parameters.

In some embodiments, the data management system 110 may also integrate StringTie, a tool that assembles and quantifies RNA-Seq alignments into potential transcripts. StringTie uses an efficient network flow algorithm to assemble full-length transcripts that represent multiple splice variants for each gene locus, which can be valuable for studies on gene expression and alternative splicing. StringTie can process both short-read and long-read alignments, enhancing the versatility of the data management system 110 in handling various sequencing data types and formats.

For evaluating read distribution across different genomic regions, the data management system 110 may employ QualiMap, which classifies mapped reads from BAM files based on their origins, such as exonic, intronic, or intergenic regions. QualiMap also generates metrics on coverage depth distribution across transcript lengths, providing insights into sequencing depth and helping users assess data completeness and quality.

In some embodiments, the data management system 110 may also use DupRadar to analyze duplication rates in the sequenced data. DupRadar takes as input the BAM file with marked duplicates from Picard, along with an annotation file, to generate duplication statistics. This analysis helps users understand the degree of technical duplication in their data, which can be important for experiments where biological duplication is expected, such as RNA-Seq data from highly expressed genes.

To produce a comprehensive quality control report, the data management system 110 may integrate RSeQC and MultiQC. RSeQC provides a range of QC statistics on mapped reads, including mapping statistics, read pair inner distance, and splicing event classification. These QC metrics enable users to inspect read distributions across genomic features (e.g., exon, UTR, intron, intergenic regions), detect splicing events, and evaluate sequencing depth. MultiQC compiles the output of RSeQC and other tools into a single HTML report, presenting a consolidated view of the quality metrics in an easily accessible format.

By combining these tools into an automated, cohesive workflow, the data management system 110 simplifies post-processing tasks for users. After post-processing is completed, the data management system 110 provides results on the quality control panel, delivering notifications through email and text to inform users of data quality and suitability for downstream applications. The user interface 134 also enables users to make informed decisions on whether to proceed with or exclude specific datasets, based on quality thresholds set by the system or customized by the user.

In addition, the data management system 110 includes features that allow users to merge processed data across multiple samples without re-running experiments. This merging capability is especially useful when users want to combine results from different datasets or experimental runs for integrative analysis. The user interface 134 facilitates this by offering intuitive controls for data selection, inspection, and merging, helping users quickly assemble data for comprehensive analysis without requiring extensive technical expertise.

Example Automated Data Integration

Figure 6:
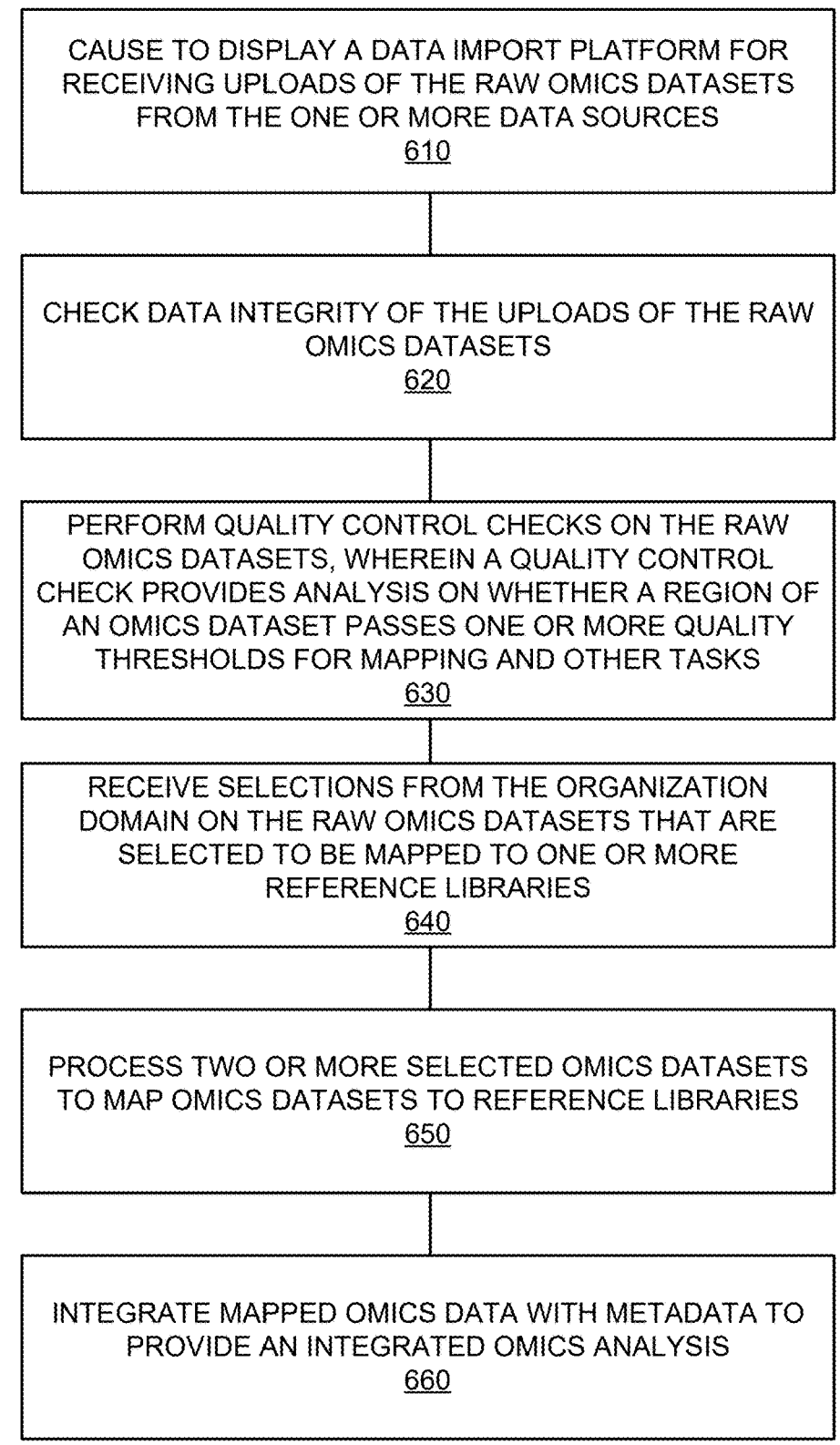
FIG. 6 is a flowchart depicting an example automated data integration process, in accordance with some embodiments.

FIG. 6 is a flowchart depicting an example automated data integration process 600, in accordance with some embodiments. In various embodiments, the process 600 may include additional, fewer, or different stages. The steps illustrated in FIG. 6 may also be performed in a different order as explicitly illustrated in FIG. 6.

The automated data integration process 600 may be performed by a centralized omics data management platform that is a part of a data management system 110. In some embodiments, the data management system 110 may include only the data management platform that performs the automated data integration process 600. In those embodiments, the data management system 110 may communicate with other external components such as data stores to perform the data management functions. In other embodiments, the data management system 110 may also include a raw data store that stores raw omics datasets belonging to an organization domain. The raw omics datasets are received from one or more data sources 125. The data sources 125 may be heterogeneous and the omics datasets may also be heterogeneous with different file formats, data structures, etc. The front end of the data management platform may be a user interface that is generated and presented in a display. The user interface allows the centralized management of the organization domain on the raw omics datasets, interpretation of patients' metadata, status of alignment processing of the selected omics datasets, and the comprehensive omics analysis.

In some embodiments, a centralized omics data management platform is operated by one or more computing devices. The one or more computing devices includes one or more processors and memory configured to store executive instructions. The instructions, when executed by the one or more processors, cause the one or more processors to perform omics data management processes that centrally manage the raw omics datasets received from the one or more data sources. The omics data management process includes various steps in the automated data integration process 600.

In some embodiments, the data management system 110 may cause 610 to display a data import platform for receiving uploads of the raw omics datasets from the one or more data sources. An example of the data import platform is shown in FIG. 7B. The data import platform may handle a variety of dataset types, including genomics, transcriptomics, and proteomics data, which may be sourced from heterogeneous environments such as local servers, public cloud storage, and research databases. By providing a user interface 134, this import platform facilitates data uploading via various mechanisms, including drag-and-drop options for files such as FastQ, BAM, and VCF, and automated imports from cloud services like AWS or Google Cloud. In addition to manual uploads, the data management system 110 may support automated data ingestion. The data management system 110 may actively monitor data sources for new uploads, triggering imports without user intervention.

In some embodiments, the data management system 110 may check 620 data integrity of the uploads of the raw omics datasets. The integrity check can include generating and comparing checksum values, such as MD5 or SHA-256 hashes, for each uploaded file to ensure no data corruption occurred during transmission. The integrity check may also include verifying file completeness, expected format compliance, and compatibility with predefined schema for omics data types like FastQ, BAM, or VCF. For example, if discrepancies are detected, the data management system 110 may flag the dataset, initiate a re-upload, or notify the user through the interface to address the issue.

In some embodiments, the data management system 110 may perform 630 quality control checks on the omics datasets. A quality control check provides analysis on whether a region of an omics dataset passes one or more quality thresholds for mapping and other tasks. The quality control check may include evaluating nucleotide quality scores, identifying adapter contamination, and examining sequencing coverage across the dataset. For instance, low-quality reads may be flagged or removed if the reads fall below a specific Phred quality threshold, reducing potential errors in alignment. Additional quality control measures might involve analyzing base composition uniformity to detect contaminants or biases introduced during sequencing. By providing detailed feedback through the user interface, the data management system 110 allows users to inspect quality metrics, ensuring that only high-quality datasets proceed to alignment. The quality control check improves various projects, particularly for large-scale projects, where automated quality control helps streamline dataset preparation, enhances reproducibility, and maintains rigorous data standards. In some embodiments, one of the quality control thresholds is determined using a machine learning model based on historical data quality metrics and user feedback. Additional examples of quality control checks are further discussed in FIG. 4 related to the quality control 450.

In some embodiments, the data management system 110 may receive 640 selections from the organization domain on the omics datasets that are selected to be mapped to one or more reference libraries. The data management system 110 may enable users or automated workflows within a domain (e.g., a research team or institution) to choose specific datasets for analysis, tailoring the selection to research needs. For example, users might select genomic data for alignment to a reference genome or proteomic data for comparison with a protein database. In the selection process, datasets can be filtered and selected based on metadata attributes such as sample type, sequencing depth, or data quality scores.

In some embodiments, the data management system 110 may process 650 one or more selected omics datasets to map omics datasets to reference libraries. The mapping process involves aligning raw sequence reads, or other omics data types, to relevant reference libraries. For genomic data, this might involve aligning DNA sequences to a reference genome library using tools such as STAR or BWA, while proteomic data may be matched to a protein reference database using mass spectrometry alignment tools. The data management system 110 may perform sequence alignment, annotation, and variant calling, generating a mapped dataset that is ready for integrated analysis. Throughout the mapping process, the data management system 110 tracks alignment quality metrics, such as read alignment percentage and variant detection accuracy, providing real-time status updates to the user interface.

In some embodiments, the data management system 110 may integrate 660 mapped omics data with metadata to provide an integrated omics analysis. For example, the analysis may be a holistic analysis towards actionable insights. Examples of analysis may include molecular pathways enrichment, network analysis and modeling towards insights such as drug target identification and drug mechanism of action. By combining genomic, transcriptomic, proteomic, and other omics data with sample metadata—such as patient demographics, disease states, or experimental conditions—the data management system 110 generates a comprehensive view of biological processes. Integrated analyses may include pathway enrichment analysis to identify overrepresented pathways, network analysis to examine protein-protein or gene-gene interactions, or predictive modeling to identify drug targets or therapeutic mechanisms. The data management system 110 may display these insights visually, making complex relationships more accessible and facilitating hypothesis generation. The integrated analysis supports various applications, such as biomarker discovery, precision medicine, and translational research, providing researchers with meaningful insights to advance scientific understanding or inform clinical decisions.

Example Graphical User Interface

FIG. 7A through FIG. 7G are conceptual diagrams illustrating various pages of a graphical user interface of a data management platform provided by the data management system 110, in accordance with some embodiments. In some embodiments, the graphical user interface (GUI) may include multiple panels organized to facilitate data importation and provide users with controls for managing data sources, monitoring import status, and configuring data parameters. The GUI may be part of a centralized platform in managing the raw omics datasets, the processed omics dataset, and the integrated omics analysis. The centralized data management platform allows a centralized management of the organization domain on the raw omics datasets, interpretation of patients' metadata, status of alignment processing of the selected omics datasets, and the comprehensive omics analysis.

The primary panel of a user interface of the data management system 110 may include a data source selection area, where users can view and select from available data sources to import. This panel could display options for different file formats or databases, allowing users to select the relevant source for their analysis needs. Next to this, a file preview panel may be available, displaying a summary or preview of the data being imported, which helps users verify file contents before initiating the import process.

An import status panel may provide real-time updates on the data import process, displaying a progress bar or similar visual indicator that informs users of the completion percentage, estimated time remaining, and any detected issues. Adjacent to this, a settings panel could allow users to customize import parameters, such as specifying file locations, choosing specific columns or data ranges, and setting options for handling missing values or duplicate entries.

Additionally, the interface may include a log or notification area to alert users of import errors, warnings, or completion notifications. This log could record each import event and associated metadata, ensuring users have a detailed record of all data sources integrated into the system.

FIG. 7A is a conceptual diagram illustrating various notifications and automated determined by the data management system 110 in importing various files. FIG. 7B is a conceptual diagram illustrating an example GUI panel for upload data files to the data management system 110 for pre-processing and processing. FIG. 7C is a conceptual diagram illustrating issues with the uploaded data files.

Figure 7D:
FIG. 7D is a conceptual diagram illustrating a visualization panel for importation of data files that are in table format, in accordance with some embodiments.

FIG. 7D is a conceptual diagram illustrating a visualization panel for importation of data files that are in table format. The visualization panel provides overall status of the upload of a data file and the processing status of each data file. The visualization panel may also provide integrity determination of each data file.

FIG. 7E is a conceptual diagram illustrating various report panels. The data management system 110 identifies issues with a data file and perform data integrity check. If the data integrity check fails, the data management system 110 may identify whether errors may have existed in the source files, uploaded files, or during transmission of the files. The data management system 110 may perform checksums and other data integrity checks to determine the issues of the data files. The data management system 110 provides recommendations as to the files, such as checking corruption, viruses, or completion of the source files, and attempting to re-upload the files.

FIG. 7F is a conceptual diagram illustrating a processing summary panel that provides an overview of ongoing or completed workflows. FIG. 7G is a conceptual diagram illustrating a processing summary panel that provides an overview of completed workflows. This panel could show a table listing datasets, the respective processing statuses, and quality control summaries. FIG. 7F shows that one or more sequence files are in progresses. FIG. 7G shows that the sequence files' processing is completed and the respective quality score is shown.

Example Machine Learning Model

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN), long short-term memory networks (LSTM), transformers, and linear recurrent neural networks such as Mamba may also be used. For example, various quality control processes performed by data preprocessing modules and outlier detection performed by data validation engines may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to detect anomalies in omics data, the training samples may be datasets with known outliers marked for reference. The labels for each training sample may be binary or multi-class. In training a machine learning model for identifying data irregularities, the training labels may include a positive label that indicates the presence of an anomaly and a negative label that indicates normal data patterns. In some embodiments, the training labels may also be multi-class, such as labeling specific types of data irregularities.

By way of example, the training set may include multiple past records with known outcomes. Each training sample in the training set may correspond to a past instance, and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to identify quality issues in omics datasets, the features in a feature vector may include genomic sequence length, gene expression level, protein concentration, etc. In various embodiments, certain pre-processing techniques may be used to normalize the values in different dimensions of the feature vector.

In some embodiments, an unsupervised learning technique may be used. The training samples used for an unsupervised model may also be represented by feature vectors but may not be labeled. Various unsupervised learning techniques such as clustering may be used to determine similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in identifying reliable omics data, the objective function may correspond to minimizing anomaly detection errors. In various embodiments, the error rate may be measured as cross-entropy loss, L1 loss (e.g., the sum of absolute differences between the predicted values and the actual value), or L2 loss (e.g., the sum of squared distances).

Figure 8:
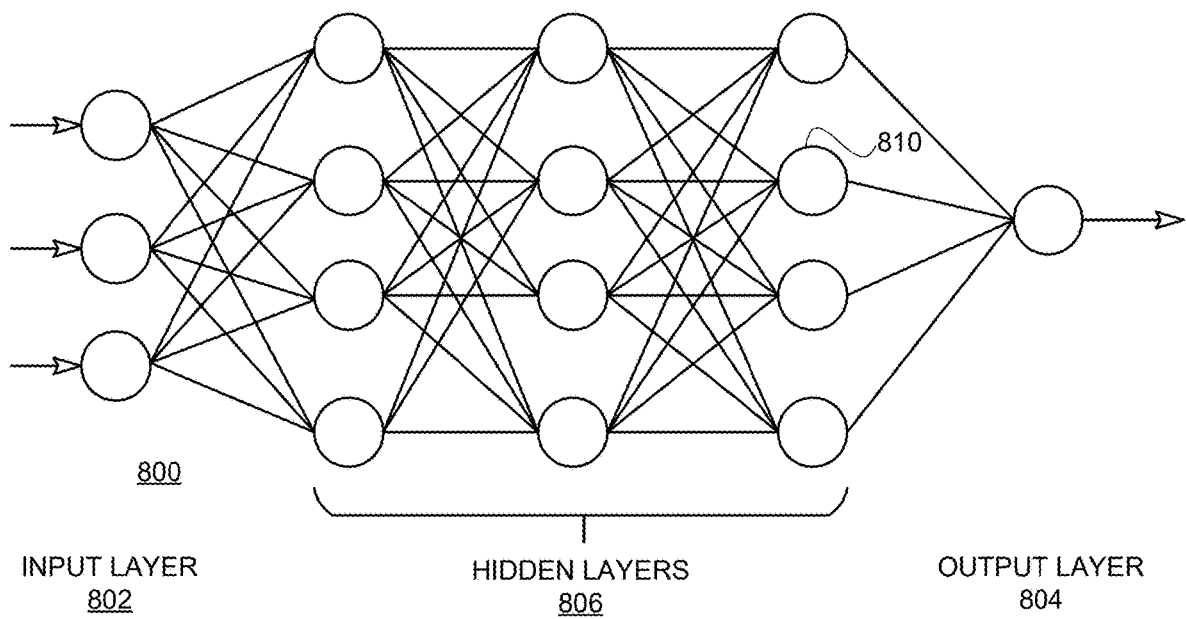
FIG. 8 is a conceptual diagram of an example architecture of a machine learning model, in accordance with some embodiments.

Referring to FIG. 8, a structure of an example neural network is illustrated, in accordance with some embodiments. The neural network 800 may receive an input and generate an output. The input may be the feature vector of a training sample in the training process and the feature vector of an actual case when the neural network is making an inference. The output may be the prediction, classification, or another determination performed by the neural network. The neural network 800 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layers and pooling layers may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be present for generating a specific format of the output. For example, a custom layer may be used for image segmentation for labeling pixels of an image input with different segment labels.

The order of layers and the number of layers of the neural network 800 may vary in different embodiments. In various embodiments, a neural network 800 includes one or more layers 802, 804, and 806 but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the number of kernels allowed to be learned may be different from other convolutional layers.

A machine learning model may include certain layers, nodes 810, kernels, and/or coefficients. Training of a neural network, such as the NN 800, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loops in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitoring the performance of the machine learning model using the objective function, and backpropagation to adjust the weights (e.g., weights, kernel values, coefficients) in various nodes 810. For example, a computing device may receive a training set that includes omics data samples with known markers. Each training sample in the training set may be assigned labels indicating valid versus anomalous markers. The computing device, in a forward propagation, may use the machine learning model to generate predicted marker statuses. The computing device may compare the predicted marker statuses with the labels of the training sample. The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing data anomaly detection in quality control or another suitable task for which the model is trained.

In various embodiments, the training samples described above may be refined and used to re-train the model, which improves the model's ability to perform the inference tasks. In some embodiments, this training and re-training process may repeat, resulting in a computer system that continues to improve its functionality through the use-retraining cycle. For example, after the model is trained, multiple rounds of re-training may be performed. The process may include periodically retraining the machine learning model. The periodic retraining may include obtaining an additional set of training data, such as through other sources, by usage of users, and by using the trained machine learning model to generate additional samples. The additional set of training data and later retraining may be based on updated data describing updated parameters in training samples. The process may also include applying the additional set of training data to the machine learning model and adjusting parameters of the machine learning model based on the application of the additional set of training data to the machine learning model. The additional set of training data may include any features and/or characteristics that are mentioned above.

Computing Machine Architecture

Figure 9:
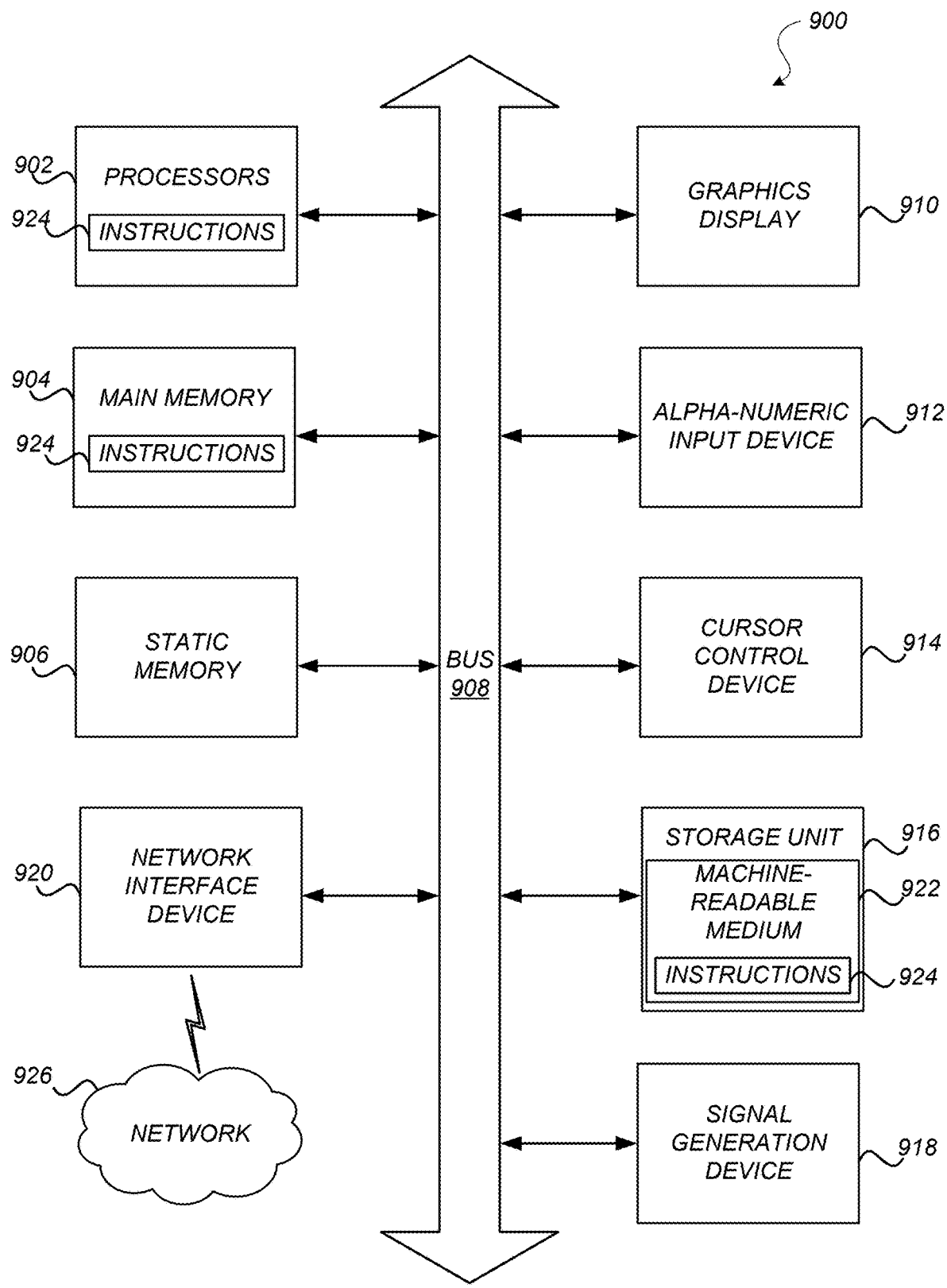
FIG. 9 is a block diagram illustrating components of an example computing machine, in accordance with some embodiments.

FIG. 9 is a block diagram illustrating components of an example computing machine that is capable of reading instructions from a computer-readable medium and executing them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the data management system 110, the sample analyzer 120, the data sources 125, the client device 130, and various engines, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the terms "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 may also include a memory 904 that stores computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 902 and reduce the space required for the memory 904. For example, the database processing techniques and machine learning methods described herein reduce the complexity of the computation of the processors 902 by applying one or more novel techniques that simplify the steps in training, reaching convergence, and generating results of the processors 902. The algorithms described herein also reduce the size of the models and datasets to reduce the storage space requirement for memory 904.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processor 902, displays a graphical user interface (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or other pointing instruments), a storage unit 916 (a hard drive, a solid-state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which are stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure. Persons skilled in the relevant art can appreciate that many modifications and variations are possible in light of the above disclosure. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A data management system, comprising:
 a data store comprising a storage memory that is configured to store datasets belonging to a domain, the datasets received from one or more data sources;
 a data management platform operated by one or more computing devices, the one or more computing devices comprising one or more processors and memory configured to store executive instructions, wherein the instructions, when executed by the one or more processors, cause the one or more processors to perform a data management process that centrally manages the datasets received from the one or more data sources, wherein the data management process comprises:
  receiving, by a data import platform, the datasets from the one or more data sources;
  checking data integrity of the datasets;
  performing a quality control check on the datasets, wherein the quality control check provides analysis on whether a region of a dataset passes one or more quality control thresholds, wherein the one or more quality control thresholds are determined using a machine learning model based on historical data quality metrics and user feedback;
  receiving selections from the domain on the datasets that are selected to be processed based on one or more reference libraries;
  processing one or more selected datasets based on the one or more reference libraries, wherein the processing comprises mapping the data of the one or more selected datasets to the one or more reference libraries to create mapped data; and
  integrating the mapped data with metadata to provide an integrated analysis, wherein the integrated analysis comprises:
   performing pathway enrichment analysis on the mapped data to identify significant pathways, and
   visualizing interaction networks to assist in identifying potential markers or targets; and
 a graphical user interface (GUI) of the data management platform for allowing management of the datasets on the domain and the integrated analysis, wherein the GUI is configured to display real-time processing status for each of the one or more selected datasets.

2. The system of claim 1, wherein the data management platform is configured to periodically retrieve new data from the one or more data sources.

3. The system of claim 1, wherein said checking data integrity of the datasets comprises:
 comparing checksum values for each file in the datasets to verify the data accuracy and completeness.

4. The system of claim 1, wherein the data management process further comprises one or more of following:
 analyzing quality scores,
 determining base composition, and/or
 identifying an adapter in the datasets.

5. The system of claim 1, wherein the data management process further comprises:
 removing duplicated reads from the datasets.

6. The system of claim 1, wherein the data management process further comprises:
 notifying users, via the GUI, any data files that fail the quality control check;
 receiving a user decision related to reprocessing a data file; and
 performing an action to reprocess the data file based on the user decision.

7. The system of claim 1, wherein the data management platform is configured to allow a user within the domain to filter and select the datasets for mapping based on a metadata attribute.

8. The system of claim 1, wherein the one or more reference libraries to which the datasets are mapped include one or more bitwise reference libraries.

9. The system of claim 1, wherein the real-time processing status comprising data import status, integrity check completion, and quality control results.

10. The system of claim 1, wherein the data management process further comprises a pre-processing stage that includes data trimming and removal of data sequences with quality scores that are below a threshold.

11. The system of claim 1, wherein the data management process further comprises a pre-processing stage that includes removal of contaminant data sequences from the datasets.

12. The system of claim 1, wherein the GUI is configured to display interpretation of the metadata, status of alignment processing of the one or more selected datasets, and a quality control result.

13. A computer-implemented method, executed by one or more computer processors, comprising:

receiving, via a network, datasets from one or more data sources;
storing the datasets belonging to a domain;
checking data integrity of the datasets;
performing a quality control check on the datasets, wherein the quality control check provides analysis on whether a region of a dataset passes one or more quality control thresholds, wherein the one or more quality control thresholds are determined using a machine learning model based on historical data quality metrics and user feedback;
receiving selections from the domain on the datasets that are selected to be processed based on one or more reference libraries;
processing one or more selected datasets based on the one or more reference libraries, wherein the processing comprises mapping the data of the one or more selected datasets to the one or more reference libraries to create mapped data;
integrating the mapped data with metadata to provide an integrated analysis,
wherein the integrated analysis comprises:
performing pathway enrichment analysis on the mapped data to identify significant pathways, and
visualizing interaction networks to assist in identifying potential markers or targets; and
causing to display, at a graphical user interface (GUI), a data management platform that allows management of the datasets on the domain and the integrated analysis, wherein the GUI is configured to display real-time processing status for each of the one or more selected datasets.

14. The computer-implemented method of claim 13, further comprising: removing duplicated reads from the datasets.

15. The computer-implemented method of claim 13, further comprising:
notifying users, via the GUI, any data files that fail the quality control check;
receiving a user decision related to reprocessing a data file; and
performing an action to reprocess the data file based on the user decision.

16. A non-transitory computer-readable medium configured to store code comprising instructions, wherein the instructions, when executed by one or more processors, cause the one or more processors to:
receive, via network, datasets from one or more data sources;
store the datasets belonging to a domain;
check data integrity of the datasets;
perform a quality control check on the datasets, wherein the quality control check provides analysis on whether a region of a dataset passes one or more quality control thresholds, wherein the one or more quality control thresholds are determined using a machine learning model based on historical data quality metrics and user feedback;
receive selections from the domain on the datasets that are selected to be processed based on one or more reference libraries;
process one or more selected datasets based on the one or more reference libraries, wherein the process comprises mapping the data of the one or more selected datasets to the one or more reference libraries to create mapped data;
integrate the mapped data with metadata to provide an integrated analysis
wherein the integrated analysis comprises:
perform pathway enrichment analysis on the mapped data to identify significant pathway, and
visualize interaction networks to assist in identifying potential markers or targets; and
cause to display, at a graphical user interface (GUI), a data management platform that allows management of the datasets on the domain and the integrated analysis, wherein the GUI is configured to display real-time processing status for each of the one or more selected datasets.

* * * * *